(12) United States Patent
Wu

(10) Patent No.: US 6,584,154 B1
(45) Date of Patent: Jun. 24, 2003

(54) MOVING-PICTURE CODING AND DECODING METHOD AND APPARATUS WITH REDUCED COMPUTATIONAL COST

(75) Inventor: Zhixiong Wu, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/435,488

(22) Filed: Nov. 8, 1999

(30) Foreign Application Priority Data

| Nov. 26, 1998 | (JP) | 10-335770 |
| Nov. 26, 1998 | (JP) | 10-335771 |
| Nov. 26, 1998 | (JP) | 10-335772 |
| Nov. 26, 1998 | (JP) | 10-335773 |

(51) Int. Cl.$^7$ ................................. H04N 7/32
(52) U.S. Cl. ...................... 375/240.16; 375/240.21
(58) Field of Search ........ 348/699; 375/240.12–240.16, 375/240.18, 240.2, 240.21, 240.25; 386/111; H04N 7/12, 7/30, 7/32

(56) References Cited

U.S. PATENT DOCUMENTS

| 5,113,255 A | * | 5/1992 | Nagata et al. ............ 348/699 |
| 5,386,241 A | * | 1/1995 | Park .................. 375/240.2 |
| 5,410,307 A | * | 4/1995 | Hekstra et al. ........ 375/240.14 |
| 5,504,530 A | * | 4/1996 | Obikane et al. ....... 375/240.25 |
| 5,737,019 A | * | 4/1998 | Kim ................... 375/240.2 |
| 5,751,888 A | * | 5/1998 | Fukuchi et al. ........... 386/111 |
| 5,835,151 A | * | 11/1998 | Sun et al. .............. 375/240.2 |
| 6,025,878 A | * | 2/2000 | Boyce et al. .......... 375/240.16 |
| 6,130,911 A | * | 10/2000 | Lei .................. 375/240.18 |
| 6,175,592 B1 | * | 1/2001 | Kim et al. ............. 375/240.2 |
| 6,272,180 B1 | * | 8/2001 | Lei .................. 375/240.16 |
| 6,295,320 B1 | * | 9/2001 | Lim et al. ............. 375/240.18 |

OTHER PUBLICATIONS

S. Fujiwara; *Saishin MPEG Kyokasho; Newest MPEG Textbook*, ASCII, 1995, pp. 129–155 (no translation).
K.R. Rao et al.; *Gazo Fuguoka Gijutsu—DCT to sono Kokusai Hyojun; Image Coding Technology—the DCT and It's International Standards*; OHM, pp 57–67 (no translation).

* cited by examiner

Primary Examiner—Richard Lee
(74) Attorney, Agent, or Firm—Rabin & Berdo, P.C.

(57) ABSTRACT

A coded moving-picture signal is decoded by a resolution-converting motion compensation process and a resolution-converting inverse discrete cosine transform, both of which decrease the resolution of the picture, thereby reducing the amount of reference picture data that has to be stored and accessed. The reference picture data may also be stored in a compressed form. The resolution conversion and compression processes may also be used in the coding of the moving-picture signal. The resolution-converting inverse discrete cosine transform may be performed by output of intermediate results that have not been combined by addition and subtraction in a butterfly computation.

13 Claims, 18 Drawing Sheets

MOVING-PICTURE CODING AND DECODING METHOD AND APPARATUS WITH REDUCED COMPUTATIONAL COST

BACKGROUND OF THE INVENTION

The present invention relates to methods and apparatus for coding and decoding moving pictures.

Moving pictures are transmitted in digital form in a variety of systems, which will soon include digital television broadcasting systems. To reduce the quantity of transmitted data, digitized moving pictures must be coded at the transmitter and decoded at the receiver. The MPEG-2 coding system standardized by the Moving Picture Experts Group is widely used. In this system, a moving picture is coded predictively by a series of steps involving motion estimation, motion compensation, a discrete cosine transform (DCT), quantization, and variable-length coding. The coded data are decoded by a reverse process involving variable-length decoding, inverse quantization or dequantization, an inverse discrete cosine transform (IDCT), and motion compensation.

A general problem in this and other similar coding systems is their high computational cost. A significant part of the cost occurs in the IDCT, which involves many multiplication operations, the efficient performance of which requires extra hardware and software. Another cost occurs because of the large amount of semiconductor memory required for storing the reference pictures used in motion compensation. The many accesses required to this memory are yet another computational cost. These costs are particularly great when the transmitted picture is a high-definition television (HDTV) picture.

It would obviously be desirable to reduce these costs, particularly in broadcast receivers, the high price of which hinders the acceptance of digital broadcasting.

It would also be desirable to enable HDTV transmissions to be received by receivers equipped with standard-definition display screens, which are less expensive than high-definition display screens. This requires a process of resolution conversion.

SUMMARY OF THE INVENTION

An object of the present invention is to reduce memory requirements in a moving-picture decoder.

Another object of the invention is to reduce processing requirements in a moving-picture decoder.

Another object is to reduce memory requirements in a moving-picture coder.

Another object is to reduce processing requirements in a moving-picture coder.

A further object is to reduce the resolution of a decoded moving picture during the decoding process.

According to a first aspect of the invention, a coded moving-picture signal is decoded by the steps of:

performing an IDCT with resolution conversion, thereby generating a first picture signal with reduced resolution;

performing motion compensation, using a reduced-resolution reference picture signal, to generate a second picture signal with reduced resolution;

adding the first and second picture signals to generate an output picture signal; and storing the output picture signal for use as the reference picture signal.

According to a second aspect of the invention, an input signal representing a moving picture is coded by the steps of:

comparing the input signal with a reference picture signal having reduced resolution, selecting predictive coding or intra-frame coding, and generating motion vectors for predictive coding;

applying the motion vectors to the reference picture signal, when predictive coding is selected, and performing resolution conversion, thereby obtaining a first picture signal having full resolution and a second picture having reduced resolution;

generating a third picture signal by subtracting the first picture signal from the input signal, when predictive coding is selected;

performing a DCT on the third picture signal, obtaining a transformed picture signal;

performing an IDCT with resolution conversion on the transformed picture signal, obtaining a fourth picture signal having reduced resolution;

adding the second and fourth picture signals to obtain the reference picture signal; and storing the reference picture signal in a memory.

The first and second aspects of the invention may be combined to form a moving-picture coding and decoding system.

According to a third aspect of the invention, a predictively coded moving-picture signal is decoded by the steps of:

decoding the coded moving-picture signal with reference to a reference picture signal, obtaining an output picture signal;

compressively coding the output picture signal;

storing the compressed picture signal in a memory; and expanding the compressed picture signal to obtain the reference picture signal.

The first and third aspects of the invention may be combined.

According to a fourth aspect of the invention, a one-dimensional IDCT is performed in a first mode with full resolution, and a second mode with reduced resolution, by the steps of:

obtaining first intermediate results by performing a first matrix operation on a first input signal;

obtaining second intermediate results by performing a second matrix operation on the first input signal in the first mode, and the first matrix operation on a second input signal in the second mode;

combining the first and second intermediate results by a butterfly calculation;

selecting the combined results of the butterfly calculation for output in the first mode; and selecting the first and second intermediate results for output in the second mode.

The fourth aspect of the invention is applicable in the first and second aspects of the invention.

The invention also provides coding and decoding apparatus employing the invented methods.

DETAILED DESCRIPTION OF THE INVENTION

Figure 1:
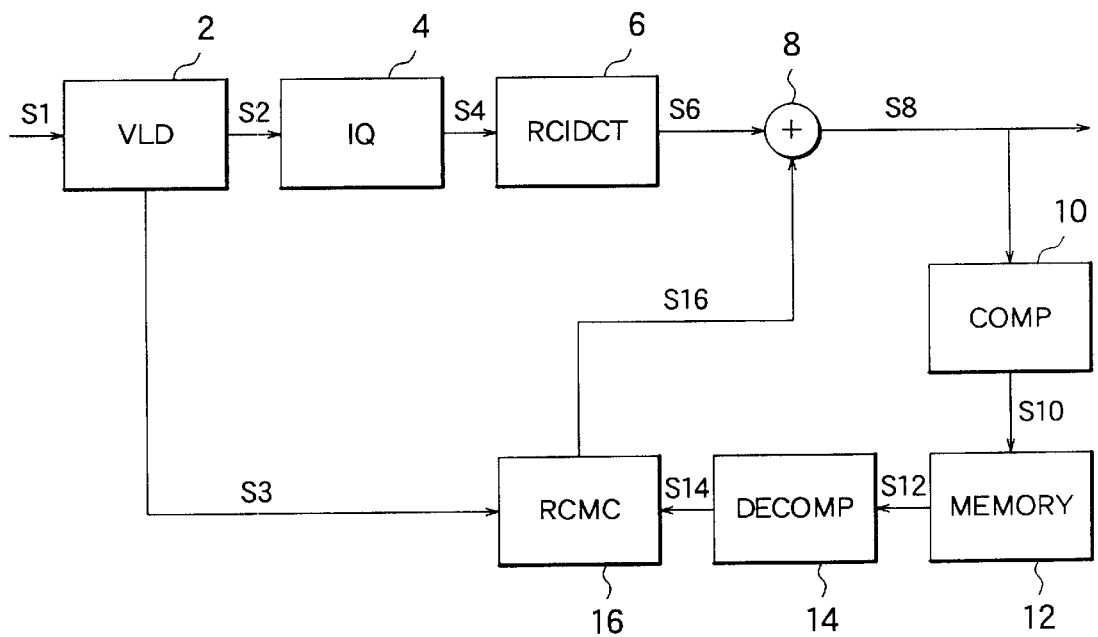
FIG. 1 is a block diagram of a moving-picture decoder illustrating a first embodiment of the invention.

Embodiments of the invention will be described with reference to the attached drawings, in which like parts are indicated by like reference characters. The term 'picture' will be used to denote one frame of a progressively scanned moving picture, and one frame or one field of a moving picture with interlaced scanning. When interlaced scanning is employed, the moving-picture data will be said to have a field-based structure if each picture is a separate field, and a frame-based structure if each picture is a complete frame. Both of these structures are employed in conventional moving-picture coders and decoders.

The two fields employed in interlaced scanning will be referred to as the top field and bottom field. When an interlaced picture is partitioned into blocks for coding purposes, the partitioning may be done in a field-block mode or a frame-block mode. In the frame-block mode, each block comprises interlaced data taken from both top and bottom fields, while in the field-block mode, each block comprises only data from one field.

A picture may be coded either by intra-frame coding or inter-frame coding. In intra-frame coding, the picture is coded without reference to other pictures. In inter-frame coding, also referred to as predictive coding, the picture content is predicted with reference to at least one other picture, and the differences between the actual picture and the predicted picture are coded. The reference picture or reference pictures may precede, follow, or precede and follow the picture being coded. The predictive coding used in the embodiments below includes motion compensation.

As the DCT and Hadamard transform are employed in the embodiments, basic information about these transforms will be summarized here.

The one-dimensional DCT is defined by the following equation (1), in which x(n) are the values of consecutive picture elements or pixels (n=0 to N−1). N is a positive integer, preferably a power of two.

$$X(m) = \sqrt{\frac{2}{N}} c(m) \sum_{n=0}^{N-1} x(n) \cos \frac{(2n+1)m\pi}{2N} \quad (1)$$

The results X(m) (m=0 to N−1) are referred to as DCT coefficients, because they represent coefficients of cosine functions.

The inverse one-dimensional DCT or one-dimensional IDCT is defined by the following equation (2).

$$x(n) = \sqrt{\frac{2}{N}} \sum_{n=0}^{N-1} c(m) X(m) \cos \frac{(2n+1)m\pi}{2N} \quad (2)$$

The quantity c(m) in equations (1) and (2) is defined as follows (3).

$$c(m) = \begin{cases} \frac{1}{\sqrt{2}}, & m = 0 \\ 1, & m = 1, \cdots N-1 \end{cases} \quad (3)$$

When N is equal to eight, the IDCT can be performed by means of the following matrix computation (4).

$$\begin{bmatrix} x(0) \\ x(1) \\ x(2) \\ x(3) \\ x(4) \\ x(5) \\ x(6) \\ x(7) \end{bmatrix} = \begin{bmatrix} C4 & C1 & C2 & C3 & C4 & C5 & C6 & C7 \\ C4 & C3 & C6 & -C7 & -C4 & -C1 & -C2 & -C5 \\ C4 & C5 & -C6 & -C1 & -C4 & C7 & C2 & C3 \\ C4 & C7 & -C2 & -C5 & C4 & C3 & -C6 & -C1 \\ C4 & -C7 & -C2 & C5 & C4 & -C3 & -C6 & C1 \\ C4 & -C5 & -C6 & C1 & -C4 & -C7 & C2 & -C3 \\ C4 & -C3 & C6 & C7 & -C4 & C1 & -C2 & C5 \\ C4 & -C1 & C2 & -C3 & C4 & -C5 & C6 & -C7 \end{bmatrix} \begin{bmatrix} X(0) \\ X(1) \\ X(2) \\ X(3) \\ X(4) \\ X(5) \\ X(6) \\ X(7) \end{bmatrix} \quad (4)$$

The matrix elements Ck are defined by the following equation (5).

$$Ck = \cos\frac{k\pi}{16} \tag{5}$$

The computation can be performed more efficiently, however, by use of the following relation (6).

$$\begin{bmatrix} x(0)+x(1) \\ x(6)+x(7) \\ x(4)+x(5) \\ x(2)+x(3) \\ x(0)-x(1) \\ x(6)-x(7) \\ x(4)-x(5) \\ x(2)-x(3) \end{bmatrix} = \begin{bmatrix} 2C4 & (C1+C3) & (C2+C6) & (C3-C7) & -(C1-C5) & -(C2-C6) & -(C5-C7) & 0 \\ 2C4 & -(C1+C3) & (C2+C6) & -(C3-C7) & (C1-C5) & -(C2-C6) & (C5-C7) & 0 \\ 2C4 & -(C5+C7) & -(C2+C6) & (C1+C5) & -(C3+C7) & (C2-C6) & (C1-C3) & 0 \\ 2C4 & (C5+C7) & -(C2+C6) & -(C1+C5) & (C3+C7) & (C2-C6) & -(C1-C3) & 0 \\ 0 & (C1-C3) & (C2-C6) & (C3+C7) & (C1+C5) & (C2+C6) & (C5+C7) & 2C4 \\ 0 & (C1-C3) & -(C2-C6) & (C3+C7) & (C1+C5) & -(C2+C6) & (C5+C7) & -2C4 \\ 0 & (C5-C7) & -(C2-C6) & -(C1-C5) & -(C3-C7) & -(C2+C6) & (C1+C3) & 2C4 \\ 0 & (C5-C7) & (C2-C6) & -(C1-C5) & -(C3-C7) & (C2+C6) & (C1+C3) & -2C4 \end{bmatrix} \begin{bmatrix} X(0) \\ X(1) \\ X(2) \\ X(3) \\ X(5) \\ X(6) \\ X(7) \\ X(4) \end{bmatrix} \tag{6}$$

If y(k) and z(k) are defined as follows (7), where k is an integer from zero to three, $$y(k)=(x(2k)+x(2k+1))/2$$

$$x(k)=(x(2k)-x(2k+1))/2 \tag{7}$$

then the above relation (6) can be decomposed into two separate matrix computations (8) and (9)

$$\begin{bmatrix} y(0) \\ y(3) \\ y(2) \\ y(1) \end{bmatrix} = \frac{1}{2}\begin{bmatrix} 2C4 & (C1+C3) & (C2+C6) & (C3-C7) & -(C1-C5) & -(C2-C6) & -(C5-C7) & 0 \\ 2C4 & -(C1+C3) & (C2+C6) & -(C3-C7) & (C1-C5) & -(C2-C6) & (C5-C7) & 0 \\ 2C4 & -(C5+C7) & -(C2+C6) & (C1+C5) & -(C3+C7) & (C2-C6) & (C1-C3) & 0 \\ 2C4 & (C5+C7) & -(C2+C6) & -(C1+C5) & (C3+C7) & (C2-C6) & -(C1-C3) & 0 \end{bmatrix} \begin{bmatrix} X(0) \\ X(1) \\ X(2) \\ X(3) \\ X(5) \\ X(6) \\ X(7) \\ X(4) \end{bmatrix} \text{ and} \tag{8}$$

$$\begin{bmatrix} z(1) \\ z(2) \\ z(3) \\ z(0) \end{bmatrix} = \frac{1}{2}\begin{bmatrix} -2C4 & (C1+C3) & (C2+C6) & -(C3-C7) & -(C1-C5) & (C2-C6) & (C5-C7) & 0 \\ 2C4 & (C1+C3) & -(C2+C6) & -(C3-C7) & -(C1-C5) & -(C2-C6) & (C5-C7) & 0 \\ -2C4 & (C5+C7) & -(C2+C6) & (C1+C5) & (C3+C7) & -(C2-C6) & (C1-C3) & 0 \\ 2C4 & (C5+C7) & (C2+C6) & (C1+C5) & (C3+C7) & (C2-C6) & (C1-C3) & 0 \end{bmatrix} \begin{bmatrix} X(4) \\ X(7) \\ X(6) \\ X(5) \\ X(3) \\ X(2) \\ X(1) \\ X(0) \end{bmatrix} \tag{9}$$

Corresponding matrix elements in these two computations (8) and (9) have identical absolute values, and the two computations can be performed by identical hardware, simply by altering the algebraic signs of some of the intermediate products. The occurrence of four zeros in each matrix also shortens the computation. The conventional IDCT results are obtained by combining the results of these two matrix computations (8) and (9) in the following so-called butterfly calculation (10).

$$x(2k)=y(k)+z(k)$$

$$x(2k+1)=y(k)-z(k) \tag{10}$$

A two-dimensional IDCT is carried out by performing a one-dimensional IDCT in both the horizontal and vertical directions.

A one-dimensional Hadamard transform of size $2^K$ can be expressed as follows (11), where K is a positive integer, and X and x are vectors with $2^K$ elements.

$$[X]=[H_{2^K}]\cdot[x] \tag{11}$$

The transform matrix is defined recursively as follows (12) (K=1, 2, 3, ... ).

$$[H_{2^K}] = \begin{bmatrix} H_{2^{K-1}} & H_{2^{K-1}} \\ H_{2^{K-1}} & -H_{2^{K-1}} \end{bmatrix}, \; [H_{2^0}] = 1 \tag{12}$$

The Hadamard transform can be carried out with little computational cost, as it requires only addition and subtraction operations, all of the matrix elements being equal to plus or minus one. A two-dimensional Hadamard transform is carried out by performing the one-dimensional Hadamard transform both horizontally and vertically.

The inverse Hadamard transform is identical to the Hadamard transform with an additional division by $2^K$, as shown in the following equation (13).

$$[x] = \frac{1}{2^K}[H_{2^K}]\cdot[X] \tag{13}$$

The inverse Hadamard transform also has a low computational cost, the division by $2^K$ being performed as a K-bit right shift.

The DCT and Hadamard transform are both examples of orthogonal transforms; that is, of angle-preserving linear transformations.

Referring to FIG. 1, the first embodiment of the invention is a moving-picture decoder comprising a variable-length decoder (VLD) 2, an inverse quantizer (IQ) 4, a resolution-converting IDCT processor (RCIDCT) 6, an adder 8, a data compressor (COMP) 10, a memory 12, a data decompressor (DECOMP) 14, and a resolution-converting motion compensator (RCMC) 16.

The variable-length decoder 2 receives a coded moving-picture signal S1 of the type generated by, for example, a conventional MPEG-2 coder, in which DCT coefficients and other information are encoded by variable-length coding rules. The variable-length decoder 2 decodes the variable-length codewords to obtain quantized DCT coefficient data S2 and control information S3. The control information S3 indicates whether intra-frame or predictive coding was employed. For pictures that were coded predictively, the control information S3 includes motion vectors.

The inverse quantizer 4 dequantizes the quantized DCT coefficient data S2 to obtain DCT coefficient data S4.

The resolution-converting IDCT processor 6 performs a resolution-converting inverse discrete cosine transform on the DCT coefficient data S4 to obtain a first picture signal S6. This operation is equivalent to a conventional IDCT followed by a down-sampling operation that reduces the amount of picture data. The first picture signal S6 output by the resolution-converting IDCT processor 6 represents either the current picture itself, if intra-frame coding was employed, or the motion-compensated difference between the current picture and a predicted picture, if predictive coding was employed, in either case at a reduced resolution.

The adder 8 adds the first picture signal S6 to a second picture signal S16 received from the resolution-converting motion compensator 16 to generate the output picture signal S8 that is output from the decoder. The output picture signal S8 represents the current picture, at the reduced resolution produced by the resolution-converting IDCT.

The data compressor 10 compresses the output picture signal S8 by, for example, performing a Hadamard transform followed by a fixed-bit-rate coding process.

The memory 12 stores the compressed picture data S10 produced by the data compressor 10, and supplies the stored data S12 on request to the data decompressor 14. The memory 12 retains stored data until the data are no longer needed for prediction purposes.

The data decompressor 14 decompresses the compressed picture data S12 by performing processes reverse to those performed by the data compressor 10, e.g., a decoding process and an inverse Hadamard transform, producing a reference picture signal S14 comprising requested reference picture data.

The resolution-converting motion compensator 16 receives the control information S3 from the variable-length decoder 2 and the reference picture signal S14 from the data decompressor 14. When the control information S3 designates predictive coding, the resolution-converting motion compensator 16 uses the motion vectors in the control information S3 to determine what reference picture data will be necessary, has the data decompressor 14 obtain the necessary reference data from the memory 12, and uses the reference data to predict the content of the current picture, thereby generating the second picture signal S16. When the control information S3 designates intra-frame coding, the second picture signal S16 is an all-zero signal.

Next, the operation of the first embodiment will be described.

The variable-length decoder 2 and inverse quantizer 4 operate according to conventional variable-length decoding and dequantization procedures, detailed descriptions of which will be omitted.

The resolution-converting IDCT processor 6 operates, for example, as follows. First, the values y(k) defined in equation (7) above are obtained by performing matrix operation (8) on an eight-by-eight block of DCT coefficients. Each y(k) is equal to the average value of two consecutive pixel values x(2k) and x(2k+1), so this operation is equivalent to a horizontal IDCT followed by horizontal down-sampling by a factor of two. Next, a conventional vertical IDCT is carried out on the down-sampled values to obtain the first picture signal S6, without further down-sampling. The total amount of picture data in the first picture signal S6 is thus reduced by a factor of two, and the amount of necessary computation is also reduced by a factor of substantially two. The amount of computation is actually reduced by more than a factor of two, as the butterfly computation (10) is omitted in the horizontal direction.

A detailed description of the computations performed by the data compressor 10 and data decompressor 14 will be omitted here. A coding process that produces a constant bit rate is used, but the compression ratio is set low enough that the coding and decoding processes do not lead to a significant loss of picture quality. For example, a compression ratio of two-thirds is employed.

The resolution-converting motion compensator 16 can perform motion compensation by up-sampling the reference picture signal S14 to the original resolution, applying the motion vectors received in the control information S3 to the up-sampled block, then down-sampling the results to match the resolution of the first picture signal S6. Preferably, however, the resolution-converting motion compensator 16 performs motion compensation by modifying the motion vectors to match the reduced resolution of the first picture signal S6 and reference picture signal S14. As an example, if the horizontal resolution is reduced by one-half, and if a motion vector indicates horizontal motion by half a pixel, the resolution-converting motion compensator 16 alters this motion vector to indicate motion by one-fourth of one pixel. That this operation is equivalent to up-sampling and down-sampling can be verified as follows.

If (a, b, c) are three horizontally consecutive pixel values in the second picture signal S14, up-sampling produces, for example, (a, a, b, b, c, c). If (A, B, C, D) are four horizontally consecutive pixels in the current picture at full resolution, after compensation for motion by half a pixel, these four values are compared with the following four values.

$$((a+a)/2, (a+b)/2), (b+b)/2, (b+c)/2)$$

The differences are:

$$(A-(a+a)/2, B-(a+b)/2), C-(b+b)/2, D-(b+c)/2)$$

Down-sampling by taking averages of adjacent difference values produces the following results:

$$((A+B)/2-(3a+b)/4, (C+D)/2-(3b+c)/4)$$

These are also the results that would be produced by 1/4-pixel motion compensation between the half-resolution second picture signal S14 (a, b, c) and the half-resolution first picture signal S6 ((A+B)/2, (C+D)/2). By reducing the motion-vector values by half in one direction and working entirely at the reduced resolution, the resolution-converting motion compensator 16 can perform motion compensation with substantially half the conventional amount of computation.

The first embodiment accordingly reduces the amount of computation in both the IDCT and motion-compensation processes, which are the most computationally intensive parts of the decoding process, by a factor of, for example, two. This reduction compensates for the amount of additional computation necessary in the data compressor 10 and data decompressor 14, so the total amount of computation is not increased, while the amount of data that has to be stored in the memory 12 is significantly reduced. If the resolution-converting IDCT processor 6 reduces the resolution by a factor of two in just one direction and the data compressor 10 operates with a compression ratio of two-thirds, for example, the amount of data stored in the memory 12 is reduced by a factor of three, and the number of memory accesses is similarly reduced.

Not only is the total amount of computation not increased; the total amount is in general reduced, because the Hadamard transform, which requires only addition and subtraction operations, is much simpler than the IDCT, which requires multiplication.

By using resolution conversion and data compression together, the first embodiment is able to take advantage of both processes without significant adverse effects. The modest reduction in resolution carried out by the resolution-converting IDCT processor 6 and resolution-converting motion compensator 16 does not require a great sacrifice of picture quality, and the modest degree of compression performed by the data compressor 10 can be achieved without a large amount of computation, again without great sacrifice of picture quality.

In a variation of the first embodiment, the resolution conversion factor used in the resolution-converting IDCT processor 6 and resolution-converting motion compensator 16 and the data compression factor used in the data compressor 10 and decompressor 14 are varied adaptively, according to picture characteristics, to provide an optimal combination of these two processes.

Next, a second embodiment will be described.

Figure 2:
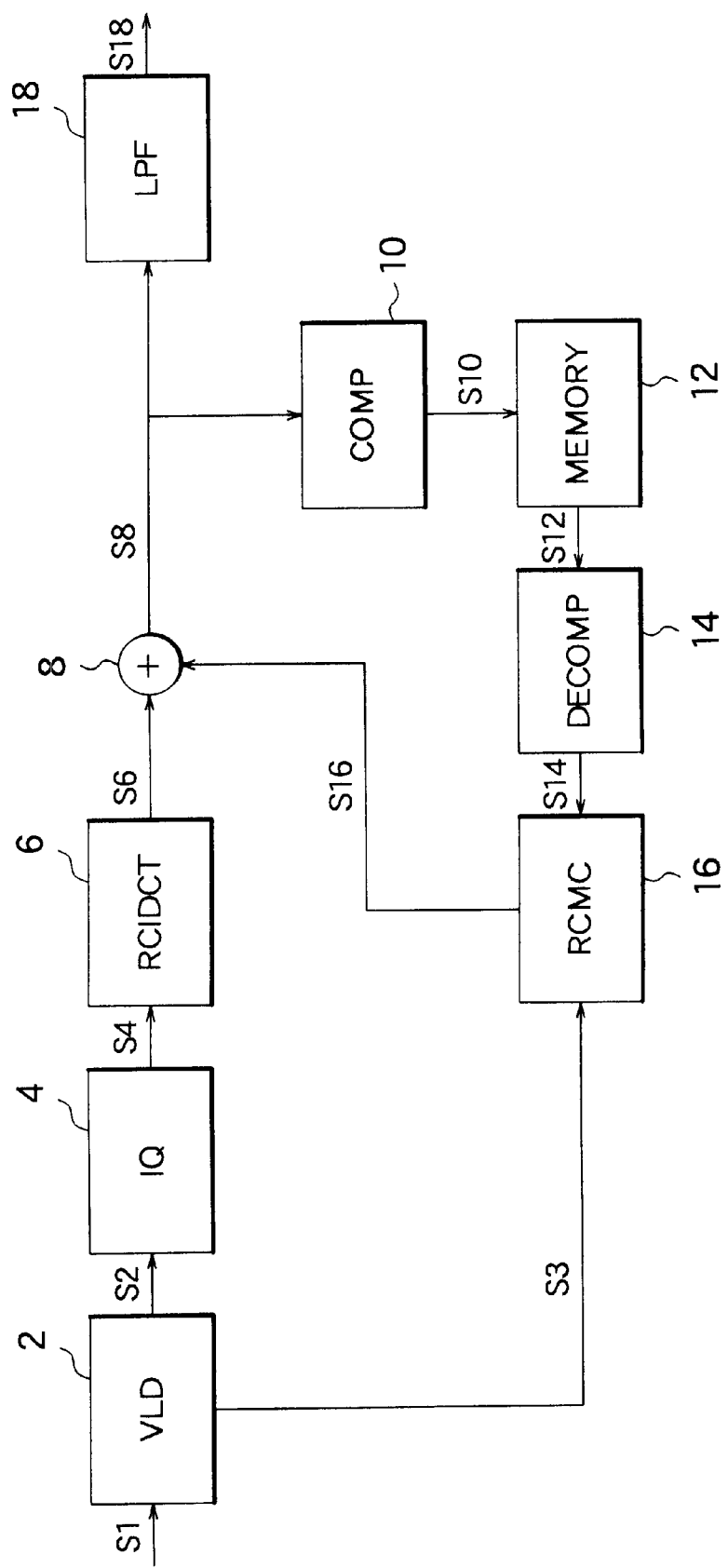
FIG. 2 is a block diagram of a moving-picture decoder illustrating a second embodiment.

Referring to FIG. 2, the second embodiment adds a low-pass filter (LPF) 18 to the configuration of the first embodiment. The low-pass filter 18 filters the output picture signal S8 to obtain a filtered output signal S18. The low-pass filter 18 operates only on pictures coded by intra-frame coding, and on the succeeding few predictively coded pictures, using predetermined initial filter coefficients for the intra-frame-coded picture, and successively weaker filter coefficients for the succeeding few predictively coded pictures or inter-frames.

As one example of filter coefficients that may be used, in an intra-frame-coded picture or intra-frame, if X, Y, and Z are three consecutive pixel values, the filter 18 replaces by the following value $$(X+2Y+Z)/4$$

The filter coefficients (1/4, 2/4, 1/4) in this case can be expressed more compactly by the notation (1, 2, 1)//4. An example of the complete set of coefficients used by the filter 18, expressed in the same notation, is the following:

Intra-frame (1, 2, 1)//4
1st inter-frame (1, 4, 1)//6
2nd inter-frame (1, 6, 1)//8
3rd inter-frame (1, 8, 1)//10

In the fourth and succeeding predictively coded pictures following an intra-frame, the filter 18 simply outputs the output picture signal S8 received from the adder 8, without alteration.

The other elements in the second embodiment operate as described in the first embodiment.

Figure 3:
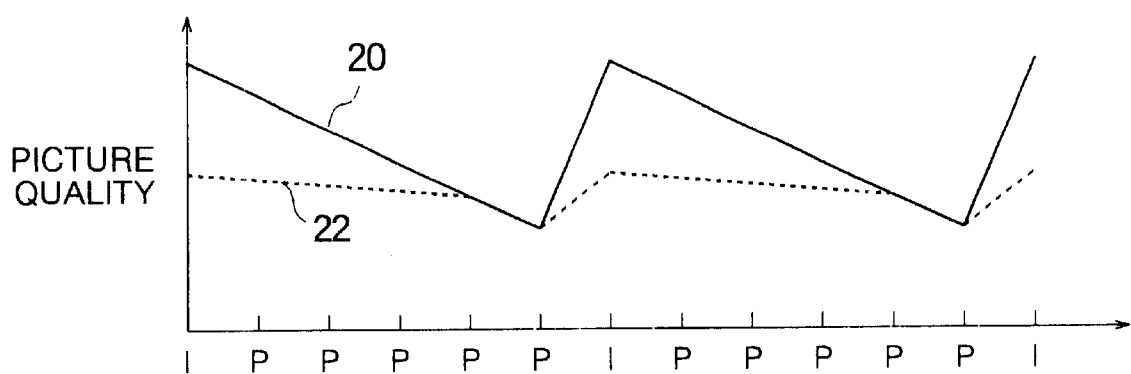
FIG. 3 is a graph illustrating picture quality as a function of time in the first and second embodiments.

FIG. 3 illustrates the operation of the first and second embodiments in terms of picture quality, represented in arbitrary units on the vertical axis, over a period of time, represented on the horizontal axis. The letter I represents the occurrence of an intra-frame. The letter P represents a predictively coded picture.

In the first embodiment, following each intra-frame, there is a steady decline in picture quality over the succeeding predictively coded pictures, due to an accumulation of differences between the reference picture data used in the coder and decoder. These differences arise because a conventional coder does not convert resolution or compress and decompress the reference picture data. The discrepancies are corrected when the next intra-frame is encountered, at which point there is an abrupt improvement in picture quality, as indicated by the solid line 20. As intra-frames occur at periodic intervals, a flickering effect may be observed.

In the second embodiment, the low-pass filter 18 reduces the picture quality of an intra-frame to the level indicated by the dotted line 22. Over the next few pictures, the decrease in quality caused by increasing differences in reference picture data is largely offset by the decrease in the degree of filtering, so that picture quality decreases only slightly over the interval during which the filter 18 is operating. When the next intra-frame occurs, there is a relatively small increase in picture quality.

The overall effect of the low-pass filter 18 in the second embodiment is that picture quality is more stable than in the first embodiment, and flicker is suppressed.

Next, a third embodiment will be described.

Figure 4:
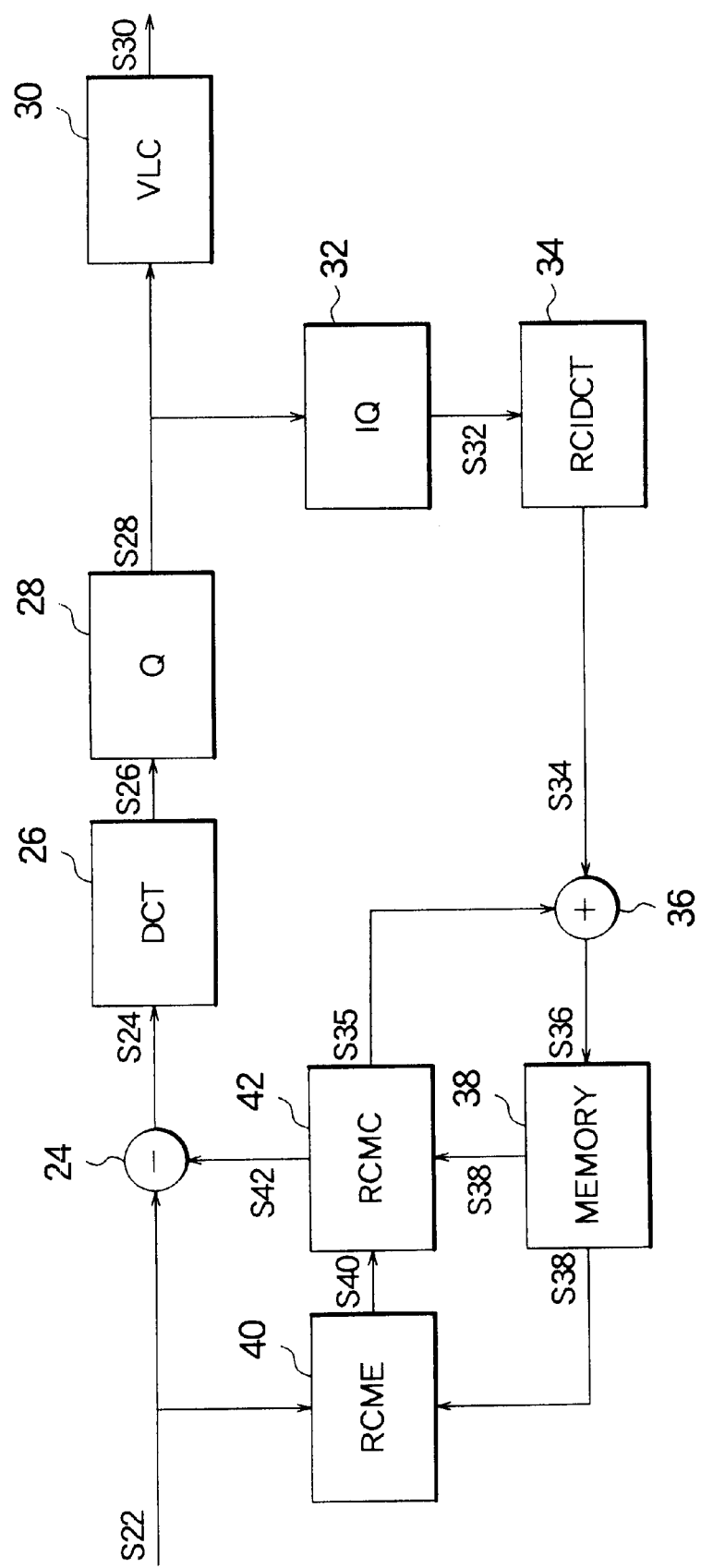
FIG. 4 is a block diagram of a moving-picture coder illustrating a third embodiment of the invention.

Referring to FIG. 4, the third embodiment is a moving-picture coder comprising a subtractor 24, a DCT processor 26, a quantizer (Q) 28, a variable-length coder (VLC) 30, an inverse quantizer 32, a resolution-converting IDCT processor 34, an adder 36, a memory 38, a resolution-converting motion estimator (RCME) 40, and a resolution-converting motion compensator (RCMC) 42.

The subtractor 24 receives a digitized moving-picture input signal S22 comprising pictures to be coded by intra-frame or inter-frame coding. For inter-frame coding, the subtractor 24 subtracts a predicted picture S42 supplied by the resolution-converting motion compensator 42 and outputs a difference picture signal S24. For intra-frame coding, this picture signal S24 is identical to the input signal S22.

The DCT processor 26 performs a conventional discrete cosine transform on the picture signal S24 received from the subtractor 24, without performing resolution conversion, to obtain DCT coefficient data S26.

The quantizer 28 quantizes the DCT coefficient data S26, using a conventional quantizing procedure.

The variable-length coder 30 carries out conventional variable-length coding on the quantized DCT coefficient data S28 and other control information. For predictively coded pictures, the control information includes motion vectors supplied by the resolution-converting motion estimator 40. The variable-length coder 30 assembles the coded information into an output bit stream S30.

The inverse quantizer 32 dequantizes the quantized DCT coefficient data S28, performing the same operation as the inverse quantizer in the first and second embodiments.

The resolution-converting IDCT processor 34 performs a resolution-converting inverse discrete cosine transform on the dequantized DCT coefficient data S32, performing the same operation as the resolution-converting IDCT processor in the first and second embodiments.

The adder 36 adds the picture signal output by the resolution-converting IDCT processor 34 and a predicted picture signal S35 supplied by the resolution-converting motion compensator 42 to obtain a reference picture signal S36. For intra-frames, the predicted picture signal S35 is an all-zero signal, and the reference picture signal S36 is identical to the picture signal S34 obtained from the resolution-converting IDCT processor 34.

The memory 38 stores the reference picture signal S36, and outputs the same reference picture signal S38 on request.

The resolution-converting motion estimator 40 compares the input picture signal S22 with the reference picture signal S38 stored in the memory 38, estimates motion, decides whether the current picture will be coded by intra-frame coding or predictive coding, and supplies resulting control information to the variable-length coder 30 and resolution-converting motion compensator 42. When predictive coding is performed, the control information S40 includes motion vectors. The reference picture signal S38 has reduced resolution, so the resolution-converting motion estimator 40 up-samples the reference picture signal S38 by, for example, reading each picture element twice. Alternatively, the resolution-converting motion estimator 40 down-samples the coded moving-picture signal S1 by, for example, taking average values of adjacent picture elements, but in either case, the motion vectors output from the resolution-converting motion estimator 40 have full resolution.

When the resolution-converting motion estimator 40 specifies predictive coding, the resolution-converting motion compensator 42 uses the motion vectors supplied by the resolution-converting motion estimator 40 and the reference picture data S38 stored in the memory 38 to generate the above-mentioned predicted picture signals S35, S42. Predicted picture signal S35 has reduced resolution; predicted picture signal S42 has full resolution.

The operations performed by the subtractor 24, DCT processor 26, quantizer 28, variable-length coder 30, inverse quantizer 32, adder 36, memory 38, and resolution-converting motion estimator 40 are similar to the operations performed in conventional moving-picture coders, and the operation of the resolution-converting IDCT processor 34 has been described in the first embodiment, so only the operation of the resolution-converting motion compensator 42 will be described below. To produce the reduced-resolution predicted picture signal S35, the resolution-converting motion compensator 42 operates in the same way as the resolution-converting motion compensator in the first embodiment. To produce the full-resolution predicted picture signal S42, the resolution-converting motion compensator 42 up-samples the reduced-resolution predicted picture signal S35. Alternatively, the resolution-converting motion compensator 42 up-samples the reference picture signal S38, uses the motion vectors to obtain the full-resolution predicted picture signal S42, then down-samples the full-resolution predicted picture signal S42 to obtain the half-resolution predicted picture signal S35.

One effect of the third embodiment is that the necessary amount of memory 38 is reduced, because the reference picture is stored at reduced resolution.

Another effect is that when the output bit stream S30 is decoded by the moving-picture decoder described in the first embodiment, both the coder and decoder refer to substantially the same reference picture data, so the picture is decoded accurately and a steady level of picture quality is maintained, avoiding the decreases and abrupt increases shown in FIG. 3.

Next, a fourth embodiment will be described.

Figure 5:
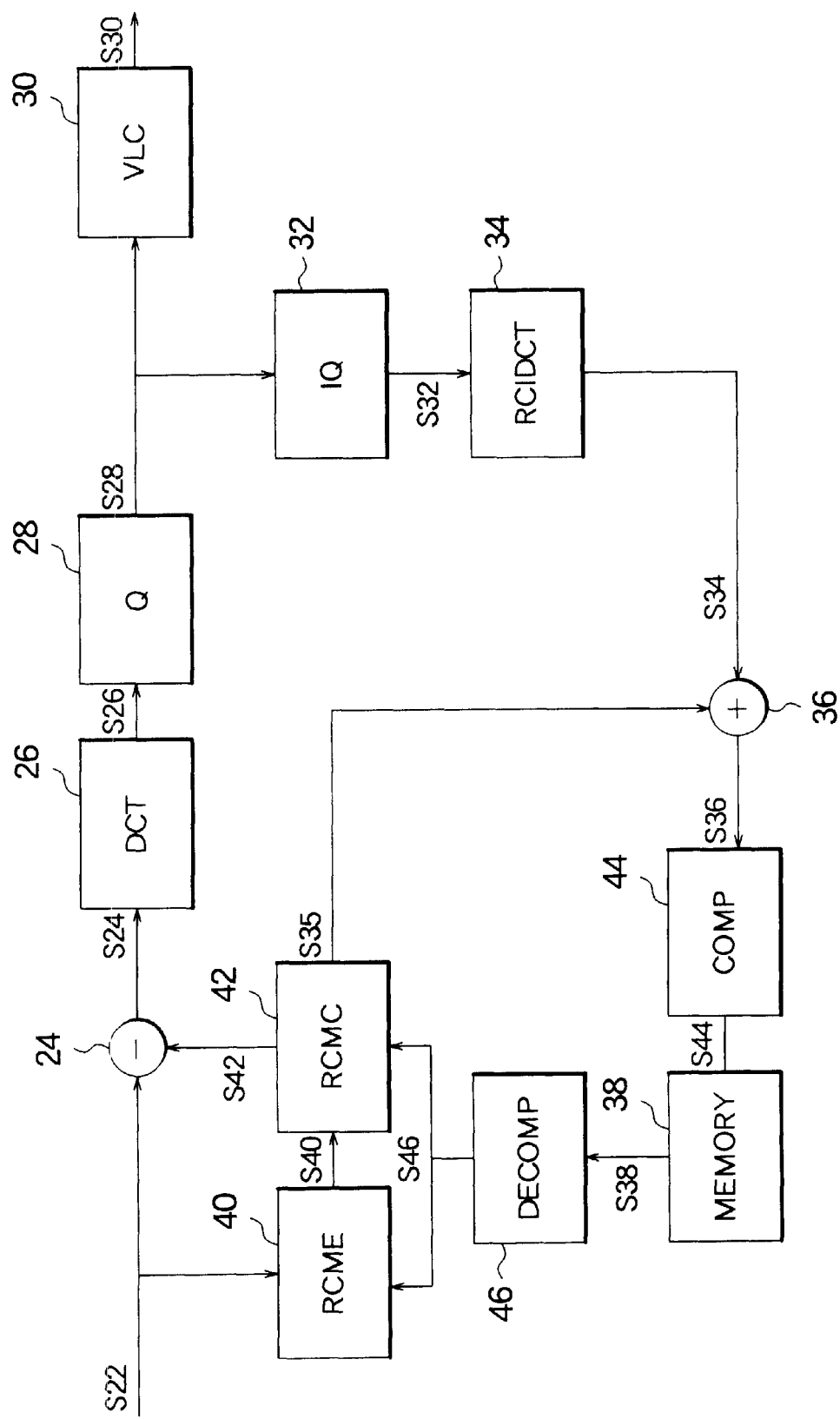
FIG. 5 is a block diagram of a moving-picture coder illustrating a fourth embodiment.

Referring to FIG. 5, the fourth embodiment adds a data compressor 44 and data decompressor 46 to the configuration described in the third embodiment. The data compressor 44, which is identical to the data compressor in the first embodiment, compresses the reference picture signal S36 output by the adder 36, and stores the compressed data S44 in the memory 38 in place of the reference picture signal S36. The data decompressor 46, which is identical to the data decompressor in the first embodiment, reads the compressed data from the memory 38 and supplies a decompressed reference picture signal S46 to the resolution-converting motion compensator 42.

The fourth embodiment operates in the same way as the third embodiment, except that the reference picture data stored in the memory 38 are compressed. As a result, even less memory is required than in the third embodiment, and the reference picture signal S46 received by the resolution-converting motion compensator 42 is identical to the reference picture signal received by the resolution-converting motion compensator in the first embodiment. When the first and fourth embodiments are used in combination, all discrepancies between the reference picture data stored in the coder and the reference picture data stored in the decoder are eliminated, so there is no loss of picture quality, apart from the reduced resolution.

Figure 6:
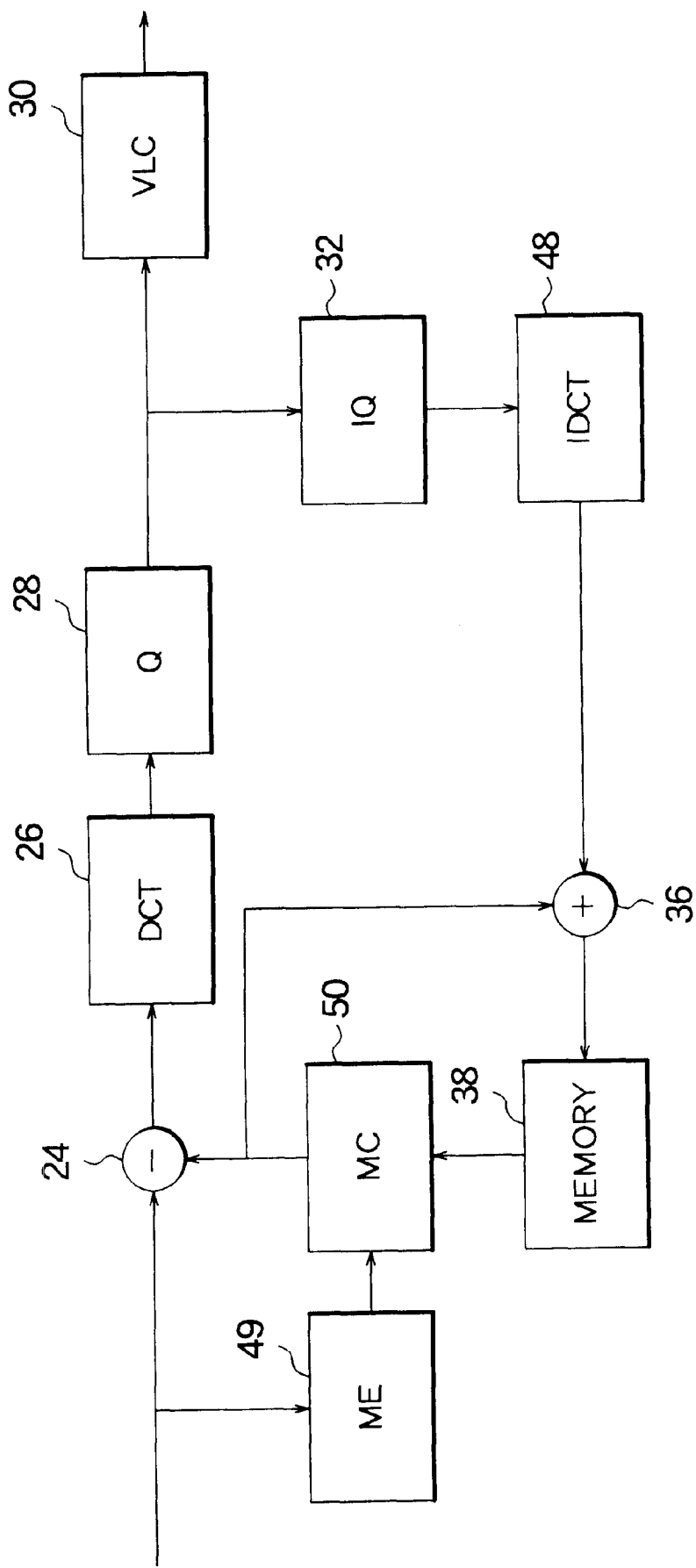
FIG. 6 is a block diagram of a conventional moving-picture coder.
Figure 7:
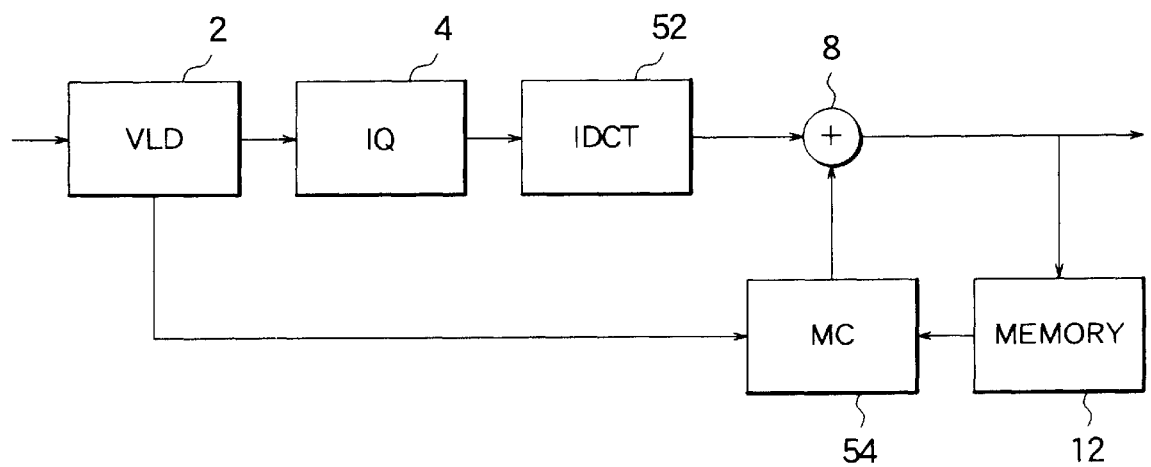
FIG. 7 is a block diagram of a conventional moving-picture decoder.

For comparison with the preceding embodiments, FIG. 6 shows a conventional moving-picture coder, and FIG. 7 shows a conventional moving-picture decoder.

The subtractor 24, DCT processor 26, quantizer 28, variable-length coder 30, and inverse quantizer 32 in FIG. 6 are similar to the corresponding elements in the third and fourth embodiments, but the dequantized DCT coefficient data output by the inverse quantizer 32 are supplied to a conventional IDCT processor 48, which does not reduce the resolution. The memory 38 must therefore have enough capacity to store the reference picture data at full resolution. The motion estimator (ME) 49 and motion compensator (MC) 50 perform motion estimation and motion compensation without changing the resolution. The motion compensator 50 supplies the same full-resolution picture signal to both the adder 36 and subtractor 24. The adder 36 and resolution-converting motion estimator 40 operate as described in the third embodiment.

The variable-length decoder 2, inverse quantizer 4, adder 8, and memory 12 in FIG. 7 are similar to the corresponding elements in the first and second embodiments. The IDCT processor 52 and motion compensator (MC) 54 do not perform resolution conversion, and the output picture signal is not compressed and decompressed, so the memory 12 must have enough capacity to store the reference picture data at full resolution.

The additional memory requirements make the conventional moving-picture coder and moving-picture decoder more expensive than the preceding embodiments. More processing is also required, since the IDCT processor 52 and motion compensator 54 operate at full resolution.

When the first four embodiments convert resolution only in the horizontal direction, the coded moving-picture signal may have any of the structures described earlier, employing progressive scanning, field-based interlaced scanning, or frame-based interlaced scanning.

Next, a fifth embodiment will be described.

Figure 8:
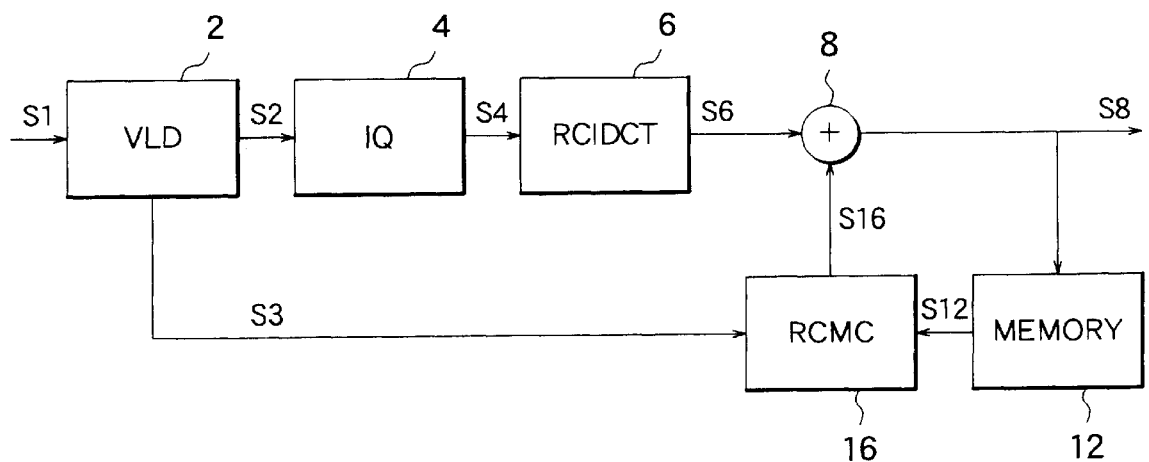
FIG. 8 is a block diagram of a moving-picture decoder illustrating a fifth embodiment of the invention.

Referring to FIG. 8, the fifth embodiment comprises the variable-length decoder 2, inverse quantizer 4, resolution-converting IDCT processor 6, adder 8, memory 12, and resolution-converting motion compensator 16 of the first embodiment, without the data compressor and data decompressor. The memory 12 stores the output picture signal S8 produced by the adder 8. The picture data S12 read from the memory 12 are supplied directly to the resolution-converting motion compensator 16. To compensate for the lack of compression and decompression, the resolution-converting IDCT processor 6 and resolution-converting motion compensator 16 preferably convert the resolution by a larger factor than in the first embodiment, by converting the resolution in both the horizontal and vertical directions, for example.

Figure 9:
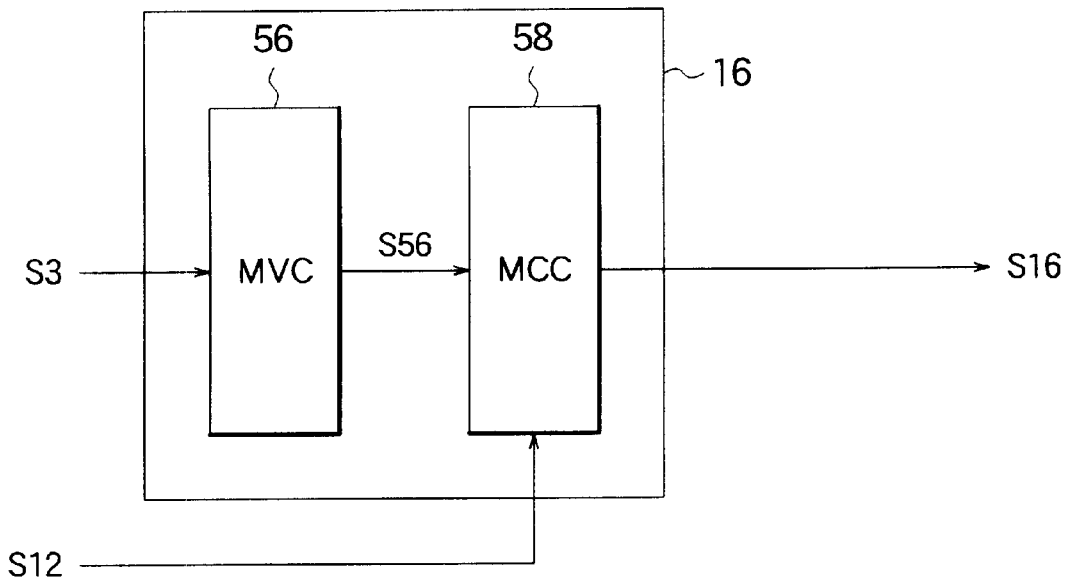
FIG. 9 is a more detailed block diagram of the resolution-converting motion compensator in the fifth embodiment.

In this case, if the coded moving-picture signal S1 employs progressive scanning, the resolution-converting motion compensator 16 preferably has the structure shown in FIG. 9, comprising a motion-vector converter (MVC) 56 and a motion-compensation calculation unit (MCC) 58. The motion-vector converter 56 decomposes a motion vector (mvx, mvy) into a reduced integer vector (imvx, imvy) and a remainder vector (smvx, smvy), and passes the decomposed motion vectors S56 to the motion-compensation calculation unit 58. If the resolution of the motion vector (mvx, mvy) is one-half of one pixel, and the resolution-converting motion compensator 16 reduces the resolution by a factor of two in both the horizontal and vertical directions, then these vectors are calculated as follows.

$$imvx=int(mvx/4)$$

$$imvy=int(mvy/4)$$

$$smvx=mvx-imvx*4$$

$$smvy=mvy-imvy*4$$

The asterisk (*) indicates multiplication. The int symbol represents the greatest-integer function; for example, int (mvx/4) is the greatest integer less than mvx/4.

The motion-compensation calculation unit 58 uses the reduced integer motion vectors (imvx, imvy) to carry out motion compensation on the reference picture signal S12. This operation is performed in the conventional manner, except that each motion vector (imvx, imvy) is applied to a block of pixels one pixel larger than the conventional block in both the horizontal and vertical directions. If the resulting motion-compensated pixel values are x(i, j), the motion-compensation calculation unit 58 adjusts these values by the following formula to obtain the pixel values x'(i, j) sent to the adder 8 as the second picture signal S16.

$$x'(i, j)=((4-smvy)*((4-smvx)*x(i, j)+smvx*x(i+1, j))+smvy*((4-smvx)*x(i, j+1)+smvx*x(i+1, j+1)))/16$$

By performing resolution conversion in this way, the resolution-converting motion compensator 16 avoids the need for extensive fractional manipulations, as both (imvx, imvy) and (smvx, smvy) are integer vectors.

Next, a sixth embodiment will be described. The sixth embodiment is a moving-picture decoder that decodes a field-based interlaced moving-picture signal. The overall structure of the sixth embodiment is the same as in the fifth embodiment, shown in FIG. 8.

Figure 10:
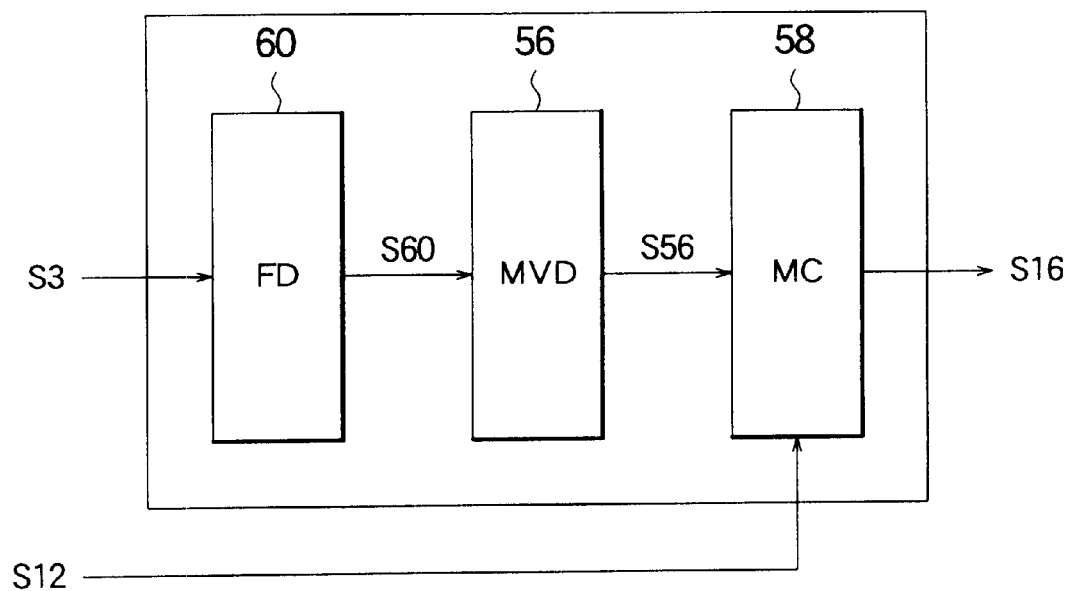
FIG. 10 is a more detailed block diagram of the resolution-converting motion compensator in a sixth embodiment.

Referring to FIG. 10, the resolution-converting motion compensator 16 in the sixth embodiment comprises a field decision unit (FD) 60, in addition to the motion-vector converter 56 and motion-compensation calculation unit 58 described in the fifth embodiment. The field decision unit 60 determines the field relationship between the first picture signal S6 and the reference picture data S12 read from the memory 12, and makes necessary adjustments to the motion vectors, which will be described below.

Figure 11:
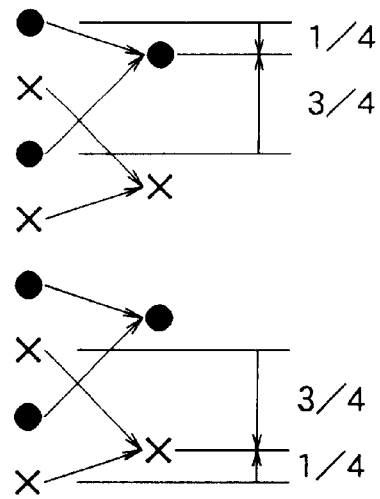
FIG. 11 is a drawing schematically illustrating vertical resolution conversion in the sixth embodiment.

The other elements of the sixth embodiment operate as described above, except that the resolution-converting IDCT processor 6 converts resolution in the vertical direction as shown in FIG. 11. The black dots indicate scanning lines disposed in the top field, both before and after resolution conversion; the x-marks indicate scanning lines disposed in the bottom field. In combining two top-field pixels xt(i) and xt(i+1) into a single top-field pixel, the resolution-converting IDCT processor 6 weights the two top-field pixels in the ratio 3:1, according to the formula, $$(3*xt(i)+xt(i+1))/4$$

In combining two bottom-field pixels xb(i) and xb(i+1) into a single bottom-field pixel, the resolution-converting IDCT processor 6 weights the two bottom-field pixels in the ratio 1:3, according to the formula, $$(xb(i)+3*xb(i+1))/4$$

The output scanning lines in the bottom field are thereby interlaced halfway between the adjacent output scanning lines in the top field, as FIG. 11 shows. Resolution conversion accordingly doubles the distance between top-field scanning lines and bottom-field scanning lines in the first picture signal S6 output from the resolution-converting IDCT processor 6, from one-half pixel to one pixel.

When the field decision unit 60 determines that the current picture in the first picture signal S6 and a reference picture used in predicting the content of this picture in the second picture signal S16 are both top fields, or both bottom fields, the relevant motion vectors in the control information S3 received from the variable-length decoder 2 are passed without alteration to the motion-vector converter 56. When the field decision unit 60 determines that the current picture is a bottom field and the reference picture is a top field, however, the field decision unit 60 increases the vertical component (mvy) of the motion vectors by one-half pixel, to compensate for the increased downward distance from the reference-picture scanning lines to the current-picture scanning lines, and passes the adjusted motion vectors to the motion-vector converter 56. When the field decision unit 60 determines that the current picture is a top field and the reference picture is a bottom field, the field decision unit 60 decreases the vertical component of the motion vectors by one-half pixel, to compensate for the increased upward distance from the reference-picture scanning lines to the current-picture scanning lines, and passes the adjusted motion vectors to the motion-vector converter 56. The motion-vector converter 56 and motion-compensation calculation unit 58 operate as described in the fifth embodiment, using the motion vectors S60 received from the field decision unit 60.

By adjusting the motion vectors in this way, the resolution-converting motion compensator 16 in the sixth embodiment is able to carry out resolution-converting motion compensation accurately regardless of the temporal distance between the current picture and the reference picture.

Next, a seventh embodiment will be described. The seventh embodiment decodes a frame-based interlaced moving-picture signal. The seventh embodiment has the same overall configuration as the fifth embodiment, shown in FIG. 8.

Since a picture is an interlaced frame, it contains both a top field and a bottom field. The resolution-converting IDCT processor 6 converts the vertical resolution of the picture as explained in the sixth embodiment, combining pairs of top-field pixels with 3:1 weighting to obtain converted top-field pixels, and pairs of bottom-field pixels with 1:3 weighting to obtain converted bottom-field pixels.

Figure 12:
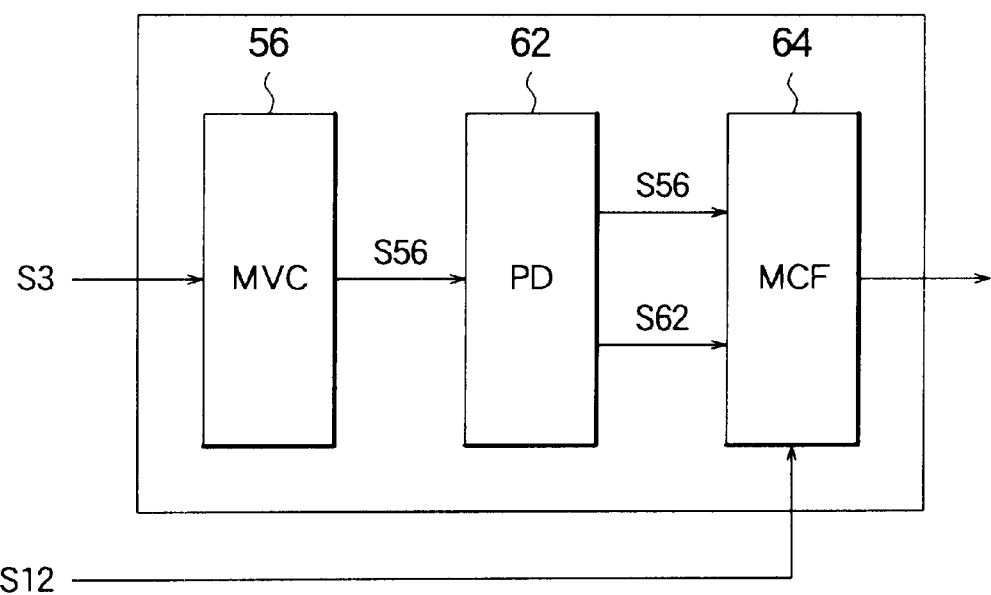
FIG. 12 is a more detailed block diagram of the resolution-converting motion compensator in a seventh embodiment.

The resolution-converting motion compensator 16 in the seventh embodiment has the structure shown in FIG. 12, comprising a motion-vector converter 56, a phase decision unit (PD) 62, and a motion-compensation filter (MCF) 64. The motion-vector converter 56 obtains integer motion vectors (imvx, imvy) and remainder vectors (smvx, smvy) as explained in the fifth embodiment.

Since the resolution-converting IDCT processor 6 operates on data a block at a time, the resolution-converting motion compensator 16 also generates predicted picture data a block at a time from the reference data stored in the memory 12. Each picture block output by the resolution-converting IDCT processor 6 begins with a top-field scanning line, but because of motion compensation, a reference picture block may start with either a top-field scanning line or a bottom-field scanning line. The reference block is said to be in phase in the former case, and out of phase in the latter case. The phase decision unit 62 determines this phase relationship by determining whether imvy is even or odd. The reference block is in phase when imvy is even, and out of phase when imvy is odd. The phase decision unit 62 provides the motion-compensation filter 64 with the decomposed motion vectors S56 and a phase signal S62 indicating the phase relationship.

Upon receiving motion vectors from the phase decision unit 62, the motion-compensation filter 64 reads a motion-compensated block of pixel values from the memory 12. Instead of starting at the position indicated by the reduced integer motion vector (imvx, imvy), the block starts at a position one line higher (imvx, imvy−1), and ends at a position two lines lower than the conventional position, so that the size of the block in increased by three lines vertically. The size of the block is also increased by one pixel horizontally. The pixel values x'(i, j) output in the second picture signal S16 are calculated from the pixel values x(i, j) in this motion-compensated block, using a filter (f) with coefficients that depend on smvy and the phase relationship detected by the phase decision unit 62, as follows.

Each output pixel value x'(i, j) is a weighted sum of eight pixel values read from the memory 12, disposed in a two-by-four rectangle with x(i, j−1) in the upper left corner and x(i+1, j+2) in the lower right corner. The weighting formula is as follows.

$$x'(i, j) = \\ ((4 - smvx) * (f(smvy, 1) * x(i, j-1) + f(smvy, 2) * x(i, j) + f(smvy, 3) * \\ x(i, j+1) + f(smvy, 4) * x(i, j+2)) + \\ smvx * (f(smvy, 1) * x(i+1, j-1) + f(smvy, 2) * x(i+1, j) + \\ f(smvy, 3) * x(i+1, j+1) + f(smvy, 4) * x(i+1, j+2)))/32$$

Figure 13:
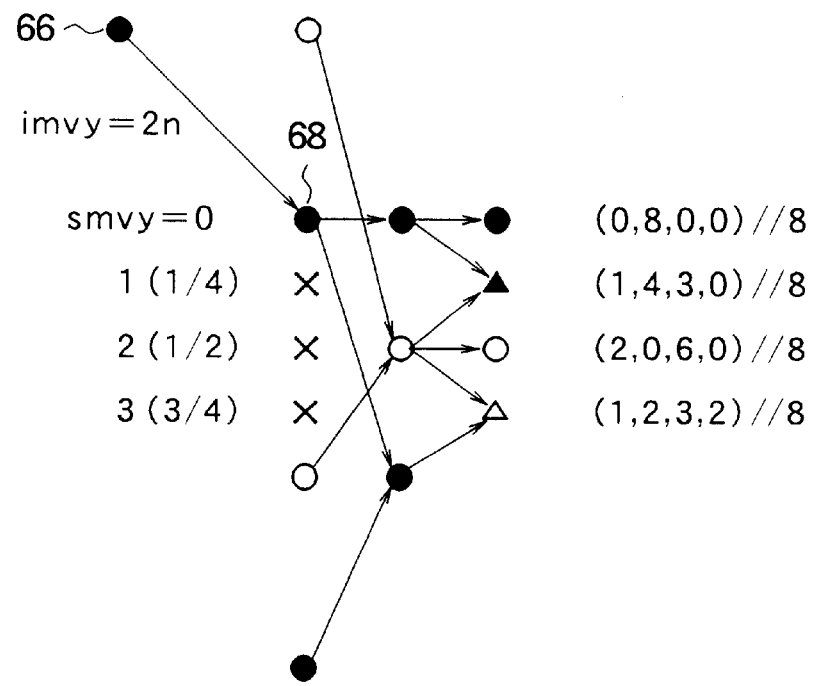
FIGS. 13 and 14 are drawings schematically illustrating vertical resolution conversion in the seventh embodiment.
Figure 14:
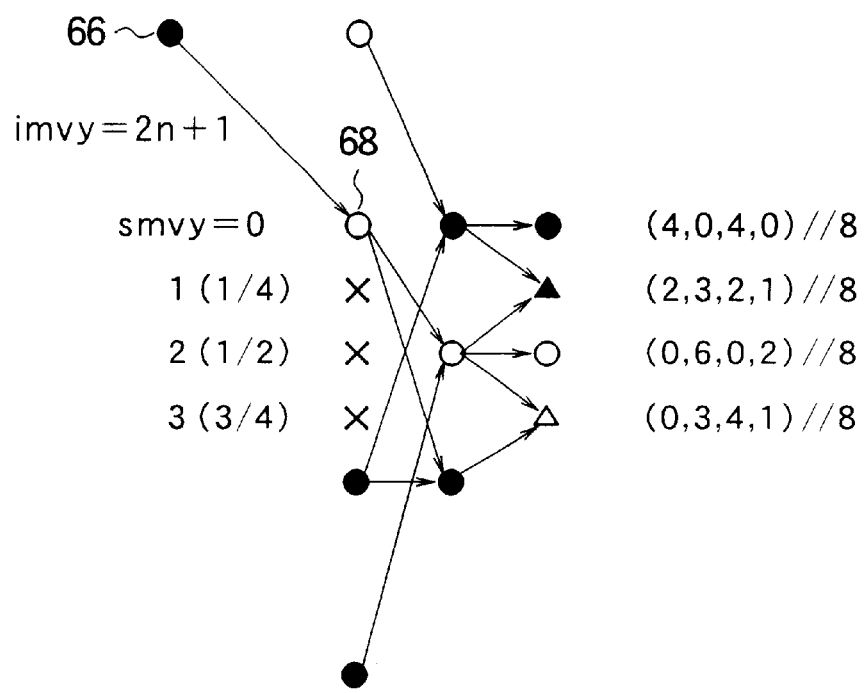

The filter f in this expression has the coefficient values indicated in FIG. 13 when the reference block is in phase, and the coefficient values indicated in FIG. 14 when the reference block is out of phase. For example, if the reference block is in phase and the vertical remainder vector component is equal to one (smvy=1), then the filter coefficients are (1, 4, 3, 0)//8, and f(smvy, 1)=1/8
f(smvy, 2)=4/8
f(smvy, 3)=3/8
f(smvy, 4)=0/8

In FIGS. 13 and 14, black dots indicate top-field pixels, white dots indicate bottom-field pixels, and triangles indicate interpolated pixels, which appear as intermediate results in the filtering calculation. The black dot 66 in the top left indicates a pixel in the current picture, and the dot 68 to which it is linked by an arrow is the reference pixel to which pixel 66 is related by the reduced integer motion vector.

The formula given above, with the coefficients shown in FIGS. 13 and 14, enables the resolution-converting motion compensator 16 in the seventh embodiment to perform resolution-converting motion compensation accurately even for the comparatively complex case in which a picture represents an interlaced field and the resolution is reduced vertically as well as horizontally. Extensive computation is not required, because the operations performed by the motion-compensation filter 64 are multiplication operations by small integers, combined with division by powers of two.

Next, an eighth embodiment will be described.

Figure 15:
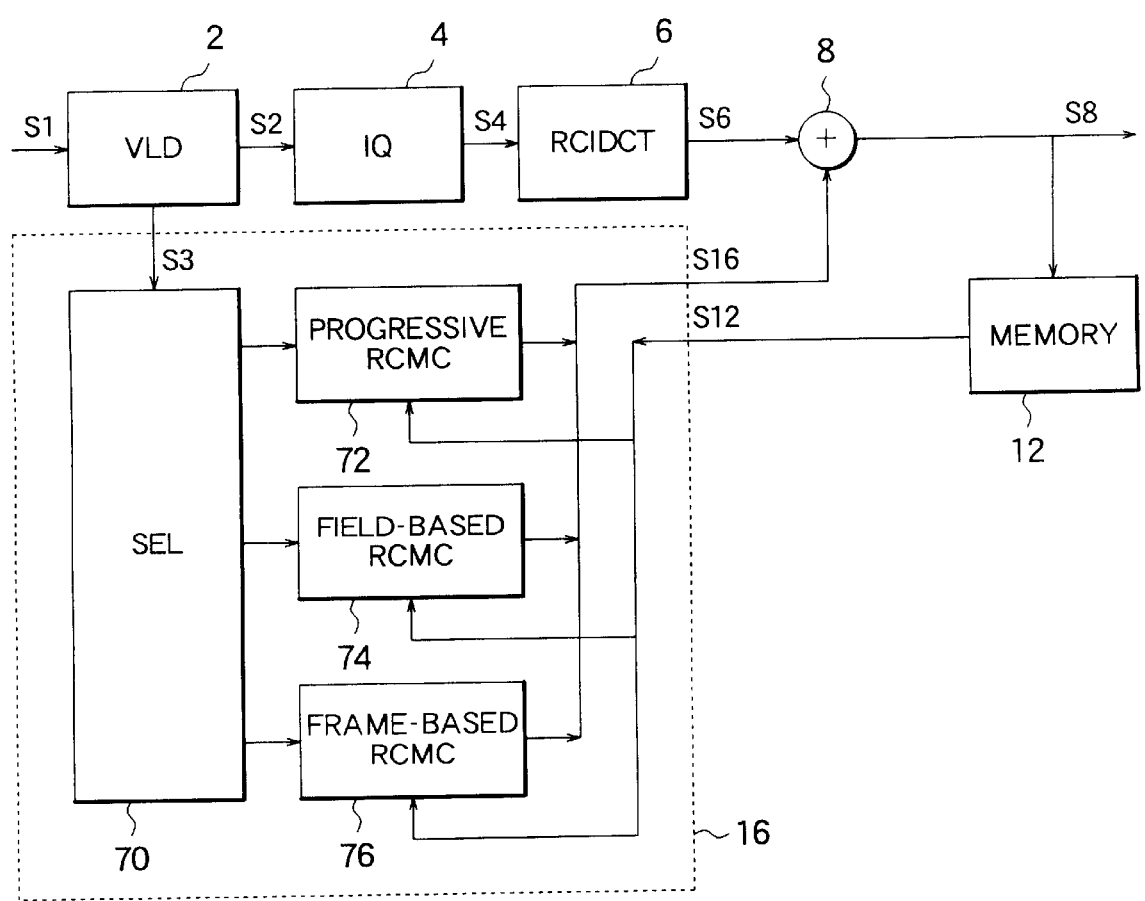
FIG. 15 is a block diagram of a moving-picture decoder illustrating an eighth embodiment.

Referring to FIG. 15, the eighth embodiment has a resolution-converting motion compensator 16 comprising a selector 70, a progressive-scanning resolution-converting motion compensation unit (progressive RCMC) 72 of the type shown in FIG. 9, a field-based interlaced-scanning resolution-converting motion compensation unit (field-based RCMC) 74 of the type shown in FIG. 10, and a frame-based interlaced-scanning resolution-converting motion compensation unit (frame-based RCMC) 76 of the type shown in FIG. 12. The selector 70 selects one of the resolution-converting motion compensation units 72, 74, 76 according to the type of coded moving-picture signal S1 being processed, as indicated in the control information S3, and passes the motion vectors and other necessary information to the selected resolution-converting motion compensator. The output of the selected resolution-converting motion compensator becomes the second picture signal S16.

The resolution-converting IDCT processor 6 operates as described in the preceding embodiments, using 3:1 and 1:3 vertical weighting ratios as in the sixth embodiment if the coded moving-picture signal S1 is interlaced. The other elements in the eighth embodiment also operate as described in the preceding embodiments.

By combining the facilities provided in the fifth, sixth, and seventh embodiments, the eighth embodiment enables resolution conversion and motion compensation to be carried out regardless of whether progressive scanning, field-based interlaced scanning, or frame-based interlaced scanning is employed in the coded moving-picture signal S1.

Next, a ninth embodiment will be described.

Figure 16:
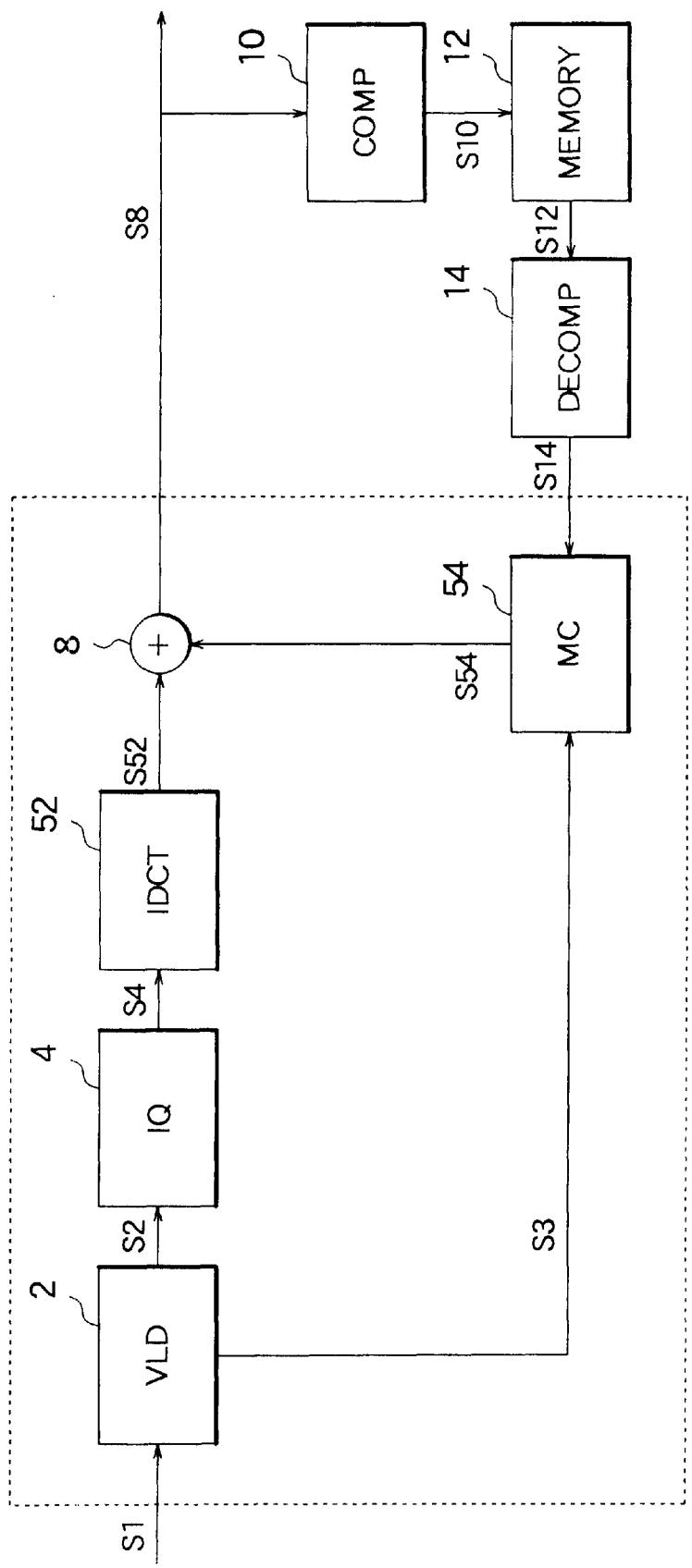
FIG. 16 a block diagram of a moving-picture decoder illustrating a ninth embodiment.

Referring to FIG. 16, the ninth embodiment comprises a variable-length decoder 2, an inverse quantizer 4, an adder 8, a data compressor 10, a memory 12, a data decompressor 14, a conventional IDCT processor 52, and a conventional motion compensator 54, interconnected as shown. The variable-length decoder 2, inverse quantizer 4, IDCT processor 52, adder 8, and motion compensator 54 constitute a predictive decoding unit 77. The picture signal S52 output by the IDCT processor 52 and the predicted picture signal S54 output by the motion compensator 54 have full resolution, as does the output picture signal S8 output from the adder 8 in the predictive decoding unit 77. The output signal S8 is compressed by the data compressor 10, stored in the memory 12, decompressed by the data decompressor 14, and supplied to the predictive decoding unit 77 as a reference picture signal S14.

The predictive decoding unit 77 operates in a conventional fashion, decoding the coded moving-picture signal S1 with reference to the reference picture signal S14. The following description will focus on the structure and operation of the data compressor 10 and data decompressor 14.

Figure 17:
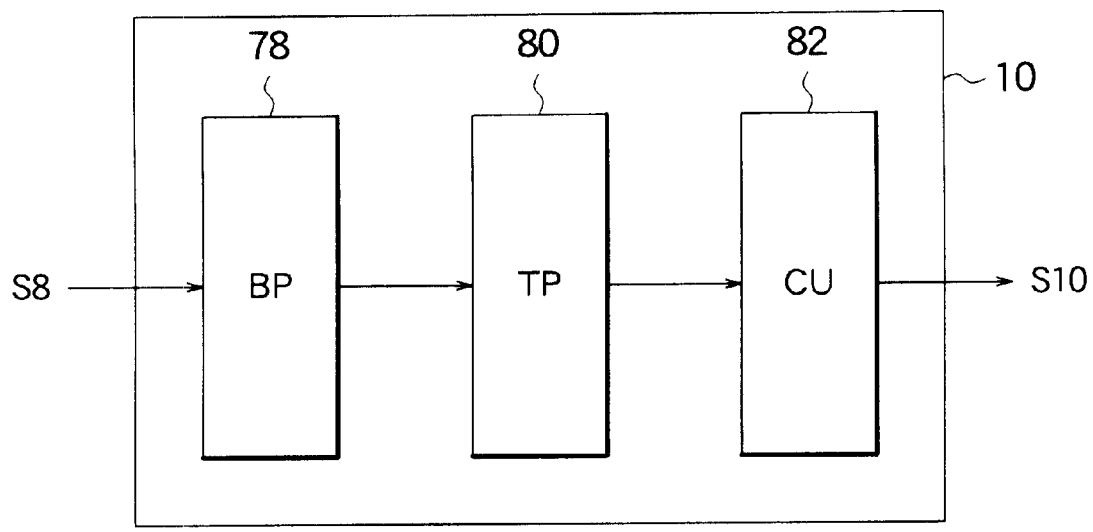
FIG. 17 is a more detailed block diagram of the data compressor in the ninth embodiment.

The data compressor 10 has the structure shown in FIG. 17, comprising a block partitioning unit (BP) 78, a transform processor (TP) 80, and a coding unit (CU) 82. The block partitioning unit 78 decomposes the output picture signal S8 into m-by-n pixel blocks, where m and n are positive integers. The transform processor 80 performs a transform such as a two-dimensional Hadamard transform on each block. The coding unit 82 codes the transformed data by performing, for example, an adaptive quantizing process, and writes the coded transformed data S10 in the memory 12.

Figure 18:
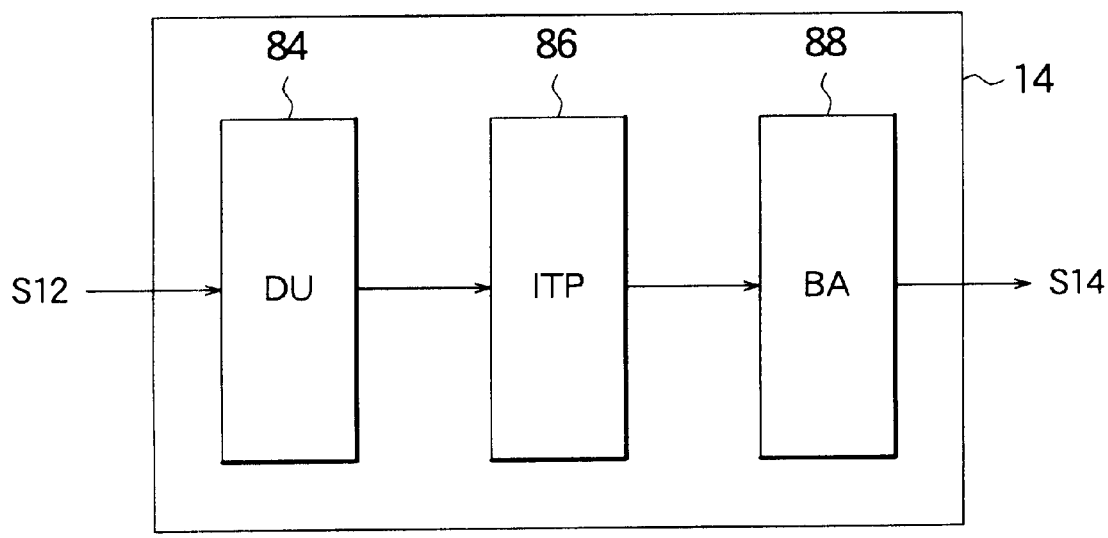
FIG. 18 is a more detailed block diagram of the data decompressor in the ninth embodiment.

The data decompressor 14 has the structure shown in FIG. 18, comprising a decoding unit (DU) 84, an inverse transform processor (ITP) 86, and a block assembler (BA) 88. The decoding unit 84 performs a decoding process reverse to the coding process performed by the coding unit 82 on the coded transformed data S12 read from the memory 12. The inverse transform processor 86 performs an inverse transform such as a two-dimensional inverse Hadamard transform to obtain m-by-n pixel blocks. The block assembler 88 assembles these blocks to obtain the reference picture signal S14.

The operation of the data compressor 10 will be described for the case in which the Hadamard transform is employed and the positive integers m and n are powers of two. The transform processor 80 performs a Hadamard transform of size m in the horizontal direction, and a Hadamard transform of size n in the vertical direction.

The coding unit 82 codes each transformed m-by-n block as a predetermined number of bits. A certain number B of these bits are assigned adaptively to each data value in the transformed block. Of these B bits, a certain number t are used as tag bits to identify absolute-value regions defined by threshold values, and the remaining (B−t) bits are used to quantize the data value.

Figure 19:
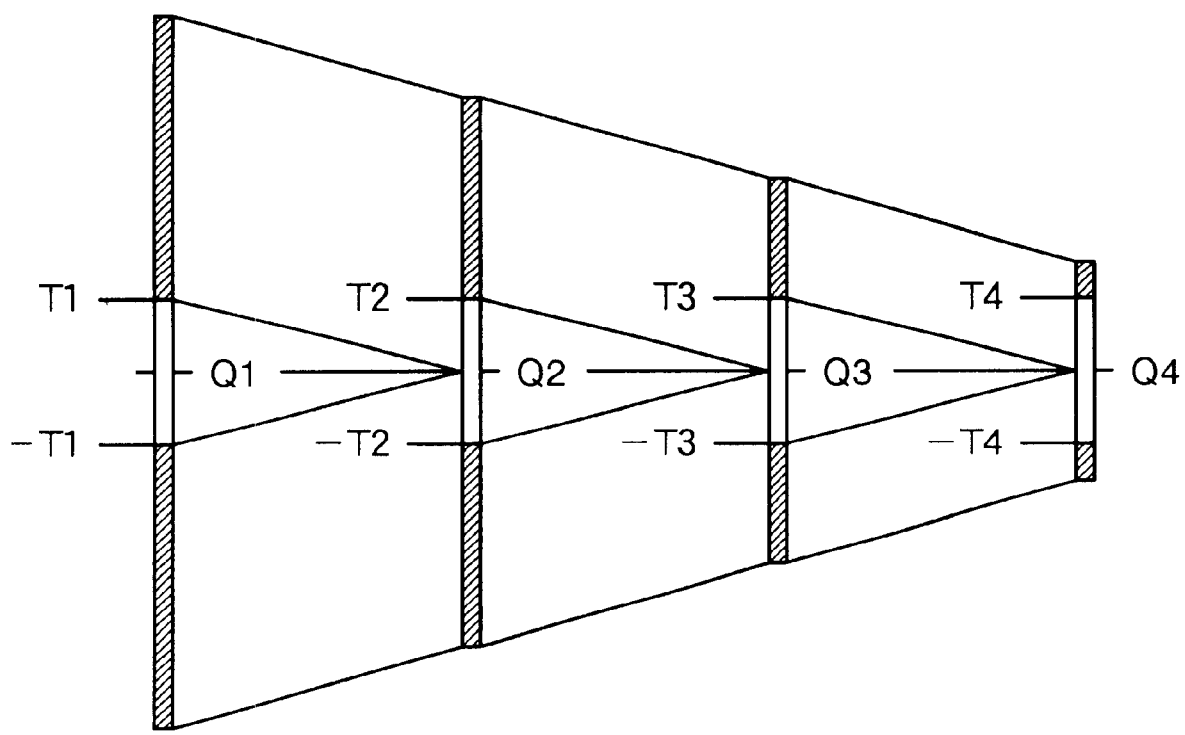
FIG. 19 is a drawing schematically illustrating the operation of the ninth embodiment.

FIG. 19 illustrates the coding process when there are two tag bits (t=2) and four threshold values T1, T2, T3, T4. The four possible combinations of values of the two tag bits identify the absolute data value as belonging to one of four regions defined by the threshold values.

Data values having absolute values within the first threshold value T1 are quantized according to a first quantizing rule Q1. If a data value exceeds the first threshold T1, then T1 is added to or subtracted from the data, reducing its absolute value by T1, and the result is compared with the second threshold value T2. If the result has an absolute value within this threshold T2, the result is quantized by a second quantizing rule Q2.

If the result has an absolute value exceeding T2, then T2 is added or subtracted and the above procedure is repeated with the next threshold T3, using a third quantizing rule Q3. If necessary, the procedure is repeated again using the fourth threshold T4 and quantizing rule Q4. Absolute values exceeding the fourth threshold T4 are clipped; that is, they are coded as if they belonged to the highest or lowest quantizing interval in quantizing rule Q4.

Each quantizing rule has $2^{B-t}$ quantizing intervals of equal size, which are coded as corresponding index values.

In the drawing, the four threshold values T1, T2, T3, T4 are drawn as equal, but in practice, increasing threshold values may be used, so that the quantizing intervals have different sizes in the different quantizing rules. The number of threshold values, their locations, and the number B of assigned bits need not be the same for all transformed data values. For example, more bits can be assigned to data values representing low spatial frequencies than to data values representing high spatial frequencies. The bit assignments can also be made to depend on picture statistics, as will be described below.

In the data decompressor 14, the decoding unit 84 uses the tag bits to identify the applicable quantizing rule, dequantizes each data value, and adds or subtracts the thresholds that were exceeded by the absolute value of the original data to obtain a decoded data value. In the dequantizing process, the index value of the k-th quantizing interval, from $X_k$ to $X_{k+1}$, ($X_k < X_{k+1}$), is dequantized to $X_k + Z_k$, where $Z_k$ is a bias value equal to $a(X_{k+1} - X_k)$, 'a' being an arbitrary constant between zero and one ($0 \leq a \leq 1$).

The inverse transform processor 86 carries out a two-dimensional inverse Hadamard transform by performing horizontal and vertical inverse Hadamard transforms.

The ninth embodiment reduces the necessary size of the memory 12 and reduces the number of memory accesses. The coding procedure described above, which assigns a fixed number of bits to each m-by-n block, has the further advantage that each block occupies a known position in the memory 12, and can be easily accessed in a random fashion by the data decompressor 14. This random access capability is extremely valuable, because the motion compensator 54 needs to be able to obtain pixel data from arbitrary locations in the reference picture.

Regarding adaptive coding, a picture with a comparatively flat aspect, lacking in variation, has small high-frequency spatial components, but the effects of visual noise are highly visible, so an ample number of bits must be assigned to the smaller high-frequency components. A picture with many large variations has large high-frequency spatial components, but noise is less noticeable, so the size of the quantization intervals can be increased without perceptible loss of picture quality. The amount of variation present in a picture can be determined from picture statistics and used to adapt the bit assignments, threshold values, and quantizing rules used in the coding unit 82 and decoding unit 84 in an appropriate manner. This type of adaptive coding allows a higher data compression ratio to be used than when the coding is not adaptive.

In a variation of the ninth embodiment, the output picture signal S8 is a color picture signal with a luminance component (Y) and color-difference components (U, V). The block partitioning unit 78 divides the luminance component into blocks of one size, and the color-difference components into blocks of another size. For example, if the Y:U:V sampling ratio is 4:1:1, the color-difference blocks may be two-by-two blocks, while the luminance blocks are four-by-four blocks. If the Y:U:V ratio is 4:2:2, the color-difference blocks may be two-by-four blocks while the luminance blocks are four-by-four blocks. In the coding unit 82, a fixed number of bits is assigned to each block in such a way that the total number of bits used to code a luminance block and its associated color-difference blocks is a multiple of the word width of the memory 12. The word width is the number of bits written or read simultaneously when the memory 12 is accessed. The luminance block and its associated color-difference blocks are stored consecutively in the memory 12.

For example, if the memory 12 has a word width of thirty-two bits, if the Y blocks are four-by-four blocks, and if the U and V blocks are two-by-two blocks, the coding unit 82 may assign ninety-eight bits to each Y block, and fifteen bits to each U block and each V block, making the total number of bits equal to one hundred twenty-eight (128=98+15+15), which is four times thirty-two. Then when the motion compensator 54 needs the Y, U, and V pixel data for the area covered by a four-by-four luminance block, the data decompressor 14 can efficiently read four consecutive words from the memory 12 and obtain just the required data, without being forced to read unnecessary bits.

If the U and V data were to be divided into larger blocks in this example, then when reading a single block of Y data, the data decompressor 14 wold be forced to read unnecessary amounts of U and V data. If the Y, U, and V blocks were to be stored separately from one another, then when reading blocks of data, the data decompressor 14 would always be forced to read unnecessary bits, because fifteen and ninety-eight are not multiples of thirty-two. In either case, access to the stored data would be less efficient.

In another variation of the ninth embodiment, the thresholds T1, T2, T3, T4 shown in FIG. 19 are powers of two. This simplifies the coding process in the coding unit 82, because if a threshold is $2^k$, for example, where k is a positive integer, then the (k+1)-bit data values from $-2^k$ to $2^k-1$ can be coded simply by extracting their most significant (B−t) bits. This operation can be performed by means of a (k+1)−(B−t)-bit right shift, after which the least significant (B−t) bits are taken. In the decoding unit 84, the data can be decoded by means of a (k+1)−(B−t)-bit left shift followed by the addition of the above-mentioned bias value ($Z_k$). Both coding and decoding are thus simplified.

In a further variation of the preceding variation, the decoding unit 84 multiplies the decoded data values by a certain power of two ($2^m$) before adding the bias value ($Z_k$), and the inverse transform processor 86 divides by the same power of two ($2^m$) following the inverse transform processing. The effect of this variation is that the bias value ($Z_k$) can be set near the center of the probability distribution of the data within each quantizing interval, thereby minimizing quantization noise, while still performing only integer arithmetic. For example, if for a certain quantizing rule the coding unit 82 performs a one-bit right shift, so that there are only two data values in each quantizing interval, then integer arithmetic would require a bias value of zero or one, while minimization of quantization noise would require a fractional bias between zero and one. If the decoded values are multiplied by $2^m$ before the bias is added, however, then the bias can have any integer value from zero to $2^m-1$, and a bias value that substantially minimizes quantization noise can be selected, yielding an improvement in picture quality. The operations of multiplying and dividing by $2^m$ are performed as an m-bit left shift and m-bit right shift, so they do not require extensive computation.

In another variation of the ninth embodiment, the Hadamard transform is replaced by another type of transform, such as a discrete cosine transform, wavelet transform, or discrete Fourier transform. Further improvements in picture quality, or in compression ratio, can be obtained by use of these transforms, but more computation is required than for the Hadamard transform.

Next, a tenth embodiment will be described.

As the present invention can be practiced without resolution conversion, with combined horizontal and vertical resolution conversion, or with resolution conversion in only one of these two directions, it is desirable to have an IDCT processor that can perform a one-dimensional IDCT in either a conventional mode or a resolution-converting mode. The tenth embodiment provides such a dual-mode IDCT processor.

Figure 20:
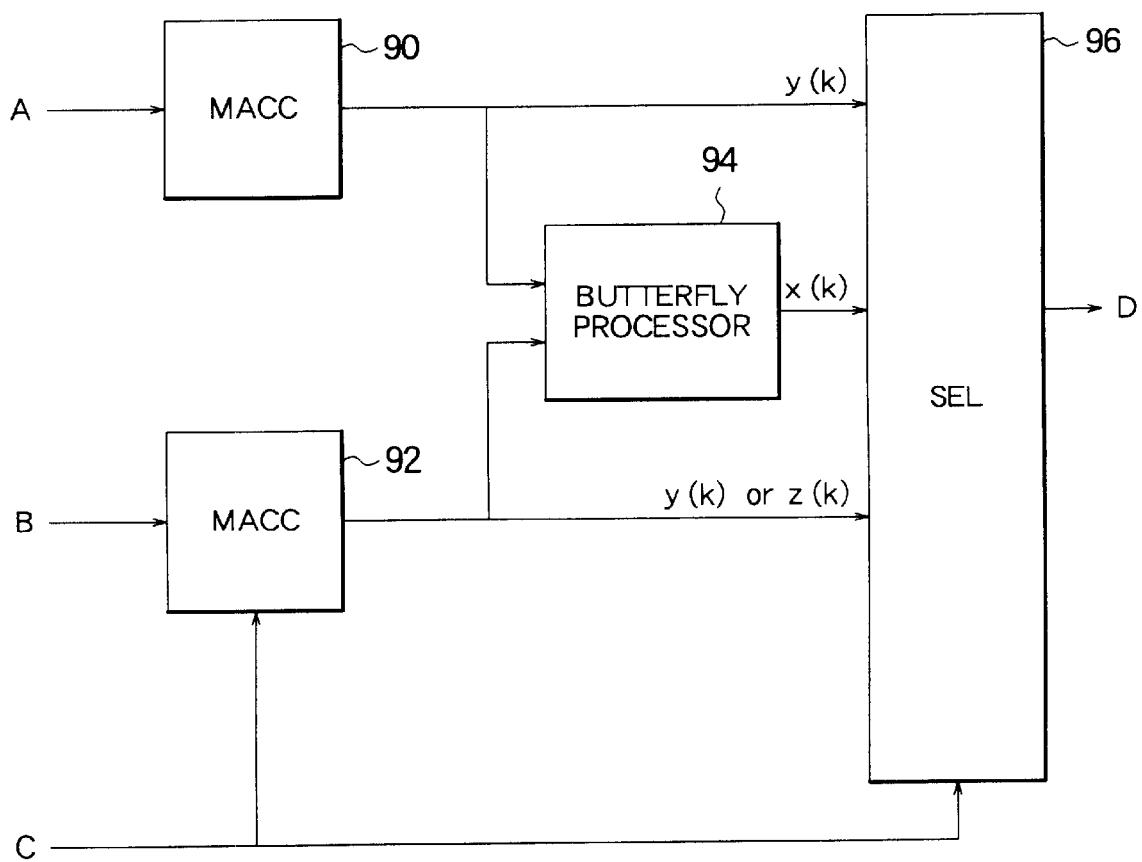
FIG. 20 is a block diagram of a one-dimensional resolution-converting IDCT processor illustrating a tenth embodiment.

Referring to FIG. 20, the dual-mode IDCT processor in the tenth embodiment comprises a pair of multiply-accumulate (MACC) processors 90, 92, a butterfly processor 94, and a selector 96. The second multiply-accumulate processor 92 and selector 96 are controlled by a control signal C generated by a control unit (not visible), selecting a full-resolution mode and a half-resolution mode.

The first multiply-accumulate processor 90 receives, for example, DCT-transformed data A comprising values from X(0) to X(7), and performs the operation in equation (8), obtaining half-resolution intermediate results y(k) which are average values of adjacent full-resolution values.

The second multiply-accumulate processor 92 receives similar DCT-transformed data B. When the control signal C selects the full-resolution mode, the second multiply-accumulate processor 92 performs the operation in equation (9), obtaining the halved differences z(k) between the adjacent full-resolution values. When the control signal C selects the half-resolution mode, the second multiply-accumulate processor 92 performs the operation in equation (8), obtaining half-resolution values y(k).

The butterfly processor 94 performs the operation in equation (10), obtaining the full-resolution values x(k) from the intermediate results y(k) and z(k) output by the multiply-accumulate processors 90, 92 when the full-resolution mode is selected.

The selector 96 selects the output of the butterfly processor 94 or the outputs of the two multiply-accumulate processors 90, 92 according to the control signal C.

When full resolution is selected by the control signal C, the two multiply-accumulate processors 90, 92 receive identical input data (A=B). The operations in equations (8) and (9) are carried out, yielding the values y(k) and z(k), from which the butterfly processor 94 obtains the full-resolution results x(k). The selector 96 selects these results x(k) as the output signal D.

When half resolution is selected, the two multiply-accumulate processors 90, 92 receive different input data A and B. Both multiply-accumulate processors 90, 92 perform the operation in equation (8). The half-resolution intermediate results y(k) for two different sets of data are thus obtained simultaneously. The computational speed is doubled, because the two multiply-accumulate processors 90, 92 operate concurrently. As the output signal D, the selector 96 selects first the results y(k) output by the first multiply-accumulate processor 90, then the results y(k) output by the second multiply-accumulate processor 92. The output of the butterfly processor 94 is not used, so the butterfly processor 94 may be disabled, or its results may be discarded.

As noted earlier, the calculations performed by the second multiply-accumulate processor 92 in the half-resolution mode, using equation (8), and full-resolution mode, using equation (9), are nearly identical, differing only the algebraic signs of certain terms. The second multiply-accumulate processor 92 accordingly does not need to be supplied with two sets of matrix elements; the control signal C only has to switch the signs of certain elements. The tenth embodiment is, accordingly, equivalent to a conventional IDCT processor with the addition of this sign-switching function and the selector 96. Compared with a conventional IDCT processor, the tenth embodiment requires only a small amount of additional hardware, and there is substantially no increase in the computational load.

Figure 21:
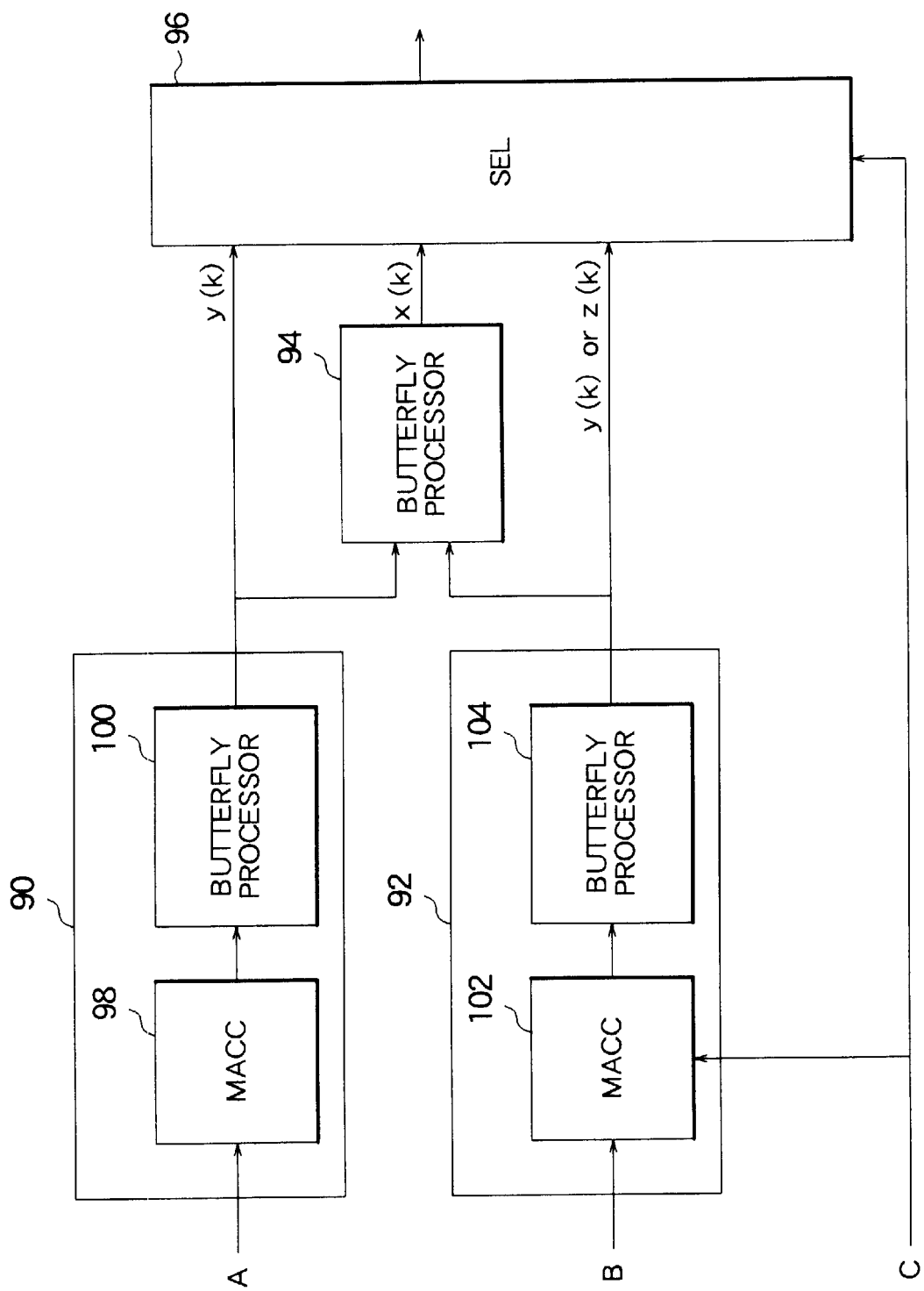
FIG. 21 is a block diagram of a one-dimensional resolution-converting IDCT processor illustrating a variation of the tenth embodiment.

Referring to FIG. 21, in a variation of the tenth embodiment, the multiply-accumulate processors 90, 92 carry out the matrix computations (8) and (9) indirectly, making use of a further butterfly computation. In place of matrix computation (8), the following matrix computation (14) is carried out on input data A by a multiply-accumulate processor 98.

$$\begin{bmatrix} y(0)+y(3) \\ y(1)+y(2) \\ y(1)-y(2) \\ y(0)-y(3) \end{bmatrix} = \begin{bmatrix} +2C4 & 0 & (C2+C6) & 0 & 0 & -(C2-C6) & 0 & 0 \\ 2C4 & 0 & -(C2+C6) & 0 & 0 & (C2-C6) & 0 & 0 \\ 0 & (C5+C7) & 0 & -(C1+C5) & (C3+C7) & 0 & -(C1-C3) & 0 \\ 0 & (C1+C3) & 0 & +(C3-C7) & -(C1-C5) & 0 & -(C5-C7) & 0 \end{bmatrix} \begin{bmatrix} X(0) \\ X(1) \\ X(2) \\ X(3) \\ X(5) \\ X(6) \\ X(7) \\ X(4) \end{bmatrix} \quad (14)$$

This computation is carried out rapidly because of the many zero elements in the matrix. A butterfly processor 100 obtains the y(k) values by adding and subtracting pairs of results from the above computation (14) and dividing by two. For example, y(1) and y(2) are obtained as follows.

$y(\mathbf{1})=((y(\mathbf{1})+y(\mathbf{2}))+(y(\mathbf{1})-y(\mathbf{2})))/2$ $y(\mathbf{2})=((y(\mathbf{1})+y(\mathbf{2}))-(y(\mathbf{1})-y(\mathbf{2})))/2$ The multiply-accumulate processor 98 and butterfly processor 100 together constitute a multiply-accumulate processor 90 that obtains the same results as in FIG. 20.

When the half-resolution mode is selected, a multiply-accumulate processor 102 and butterfly processor 104 perform the above operations on input data B. When the full-resolution mode is selected, multiply-accumulate processor 102 performs the following matrix computation (15).

accumulate processors 90, 92, and inserts a bit shifter 110 between the first multiply-accumulate processor 90 and butterfly processor 94. The matrix selectors 106, 108 and bit shifter 110 are controlled by the control signal C. The matrix selectors 106, 108 select the matrix elements used by the multiply-accumulate processors 90, 92. When the control signal C has certain values, the bit shifter 110 performs a one-bit left shift, thereby multiplying the output of the first multiply-accumulate processor 90 by two.

When the transform direction is horizontal, or when the direction is vertical and progressive scanning used, the bit shifter 110 passes the output of the first multiply-accumulate processor 90 to the butterfly processor 94 unaltered, without performing a left shift, and the matrix selectors 106, 108 provide the multiply-accumulate processors 90, 92 with the same matrix elements as in the tenth embodiment. The eleventh embodiment then operates in the same way as the tenth embodiment.

$$\begin{bmatrix} z(0)-z(2) \\ z(0)-z(3) \\ z(0)+z(3) \\ z(1)+z(2) \end{bmatrix} = \begin{bmatrix} -2C4 & 0 & (C2+C6) & 0 & 0 & +(C2-C6) & 0 & 0 \\ 2C4 & 0 & +(C2+C6) & 0 & 0 & (C2-C6) & 0 & 0 \\ 0 & (C5+C7) & 0 & +(C1+C5) & (C3+C7) & 0 & +(C1-C3) & 0 \\ 0 & (C1+C3) & 0 & -(C3-C7) & -(C1-C5) & 0 & +(C5-C7) & 0 \end{bmatrix} \begin{bmatrix} X(4) \\ X(7) \\ X(6) \\ X(5) \\ X(3) \\ X(2) \\ X(1) \\ X(0) \end{bmatrix} \quad (15)$$

This operation is identical to the operation in equation (14), except for the algebraic sign of some of the terms, so no additional matrix elements have to be stored; the control signal C only has to switch the necessary signs. The butterfly processor 104 obtains the desired results z(k) as described above. For example, $z(\mathbf{1})=((z(\mathbf{1})+z(\mathbf{2}))+(z(\mathbf{1})-z(\mathbf{2})))/2$ $z(\mathbf{2})=((z(\mathbf{1})+z(\mathbf{2}))-(z(\mathbf{1})-z(\mathbf{2})))/2$ The multiply-accumulate processor 102 and butterfly processor 104 thus combine to perform the same operations as the second multiply-accumulate processor 92 in FIG. 20, but perform it at higher speed because of the many zero elements in the matrices in equations (14) and (15).

Next, an eleventh embodiment will be described. The eleventh embodiment adds features for use with interlaced scanning to the tenth embodiment. The control signal C in the eleventh embodiment has different values depending on whether resolution conversion is performed or not, whether the transform is being performed in the horizontal or vertical direction, whether interlaced scanning is used, and when interlaced scanning is used, whether the data are organized in the field-block mode or frame-block mode.

Figure 22:
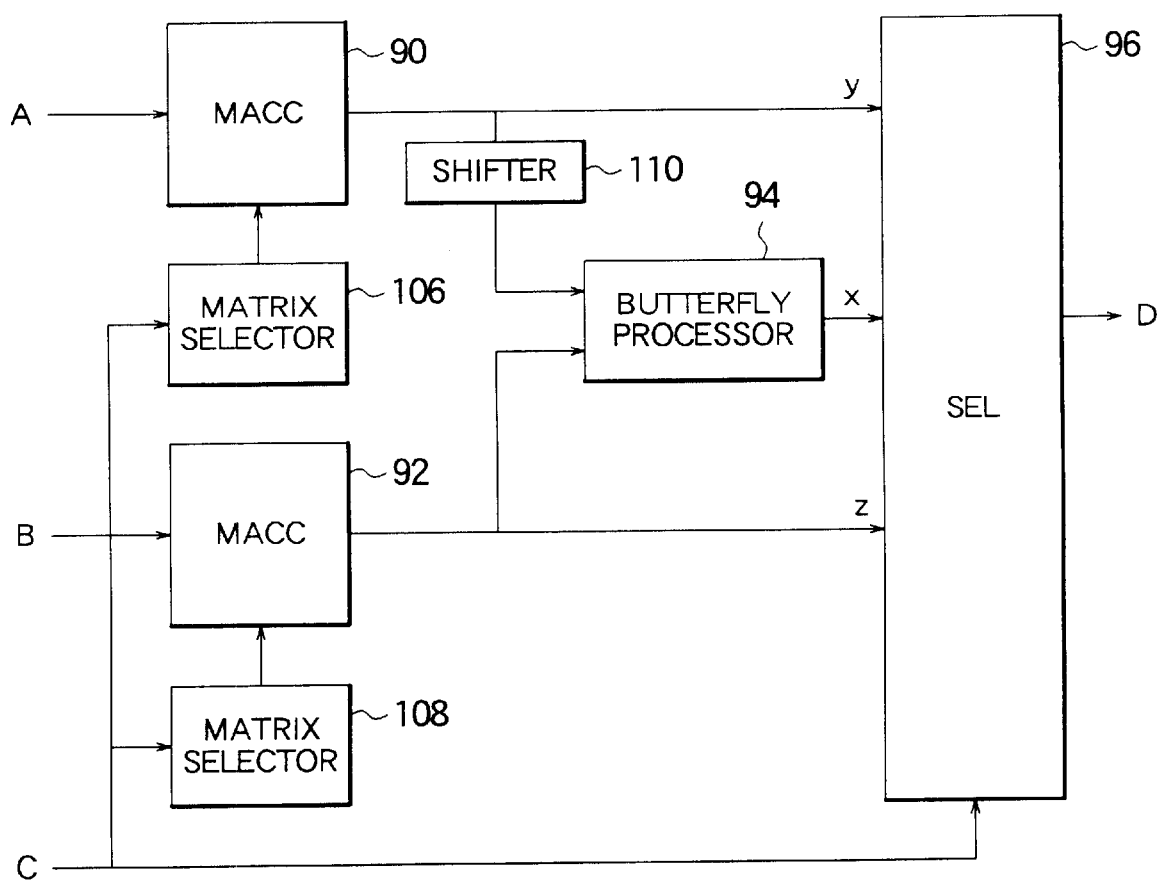
FIG. 22 is a block diagram of a one-dimensional resolution-converting IDCT processor illustrating an eleventh embodiment.

Referring to FIG. 22, the eleventh embodiment provides a pair of matrix selectors 106, 108 for the multiply- When the transform direction is vertical and interlaced scanning is employed, the same data are supplied to both multiply-accumulate processors 90, 92 (A=B), even if the resolution is converted.

When the field-block mode is employed in this case, the matrix selectors 106, 108 provide the multiply-accumulate processors 90, 92 with the same matrix elements as in the tenth embodiment. If resolution conversion is not carried out, the bit shifter 110 is disabled and the selector 96 selects the output of the butterfly processor 94, obtaining the desired values x(k) (k=0 to 7). If resolution conversion is carried out, the bit shifter 110 is enabled and the butterfly processor 94 divides the sums and differences of 2y(k) and z(k) by two, obtaining results of the following form.

$(2y(k)+z(k))/2=(3x(2k)+x(2k+1))/4$ $(2y(k)+z(k))/2=(x(2k)+3x(2k+1))/4$

The selector 96 selects the (3x(2k)+x(2k+1))/4 results for top fields, and the (x(2k)+3x(2k+1))/4 results for bottom fields, so that when the two fields are displayed they are evenly interlaced.

When the frame-block mode is employed, the matrix operation shown in equation (6) is replaced by the following matrix operation (16). The first multiply-accumulate processor 90 performs the top half of this matrix operation, obtaining sums such as x(0)+x(2). The second multiply-accumulate processor 92 performs the bottom half, obtaining differences such as x(0)−x(2).

$$\begin{bmatrix} x(0)+x(2) \\ x(5)+x(7) \\ x(4)+x(6) \\ x(1)+x(3) \\ x(0)-x(2) \\ x(5)-x(7) \\ x(4)-x(6) \\ x(1)-x(3) \end{bmatrix} = \begin{bmatrix} 2C4 & (C1+C5) & (C2-C6) & -(C1-C3) & (C5+C7) & (C2+C6) & (C3+C7) & 0 \\ 2C4 & -(C1+C5) & (C2-C6) & (C1-C3) & -(C5+C7) & (C2+C6) & -(C3+C7) & 0 \\ 2C4 & -(C3+C7) & -(C2-C6) & (C5+C7) & (C1-C3) & -(C2+C6) & (C1+C5) & 0 \\ 2C4 & (C3+C7) & -(C2-C6) & -(C5+C7) & -(C1-C3) & -(C2+C6) & -(C1+C5) & 0 \\ 0 & (C1-C5) & (C2+C6) & (C1+C3) & (C5-C7) & -(C2-C6) & -(C3-C7) & 2C4 \\ 0 & (C1-C5) & -(C2+C6) & (C1+C3) & (C5-C7) & (C2-C6) & -(C3-C7) & -2C4 \\ 0 & (C3-C7) & -(C2+C6) & (C5-C7) & -(C1+C3) & (C2-C6) & (C1-C5) & 2C4 \\ 0 & (C3-C7) & (C2+C6) & (C5-C7) & -(C1+C3) & -(C2-C6) & (C1-C5) & -2C4 \end{bmatrix} \begin{bmatrix} X(0) \\ X(1) \\ X(2) \\ X(3) \\ X(5) \\ X(6) \\ X(7) \\ X(4) \end{bmatrix} \quad (16)$$

This operation uses the same matrix elements as the operation in equation (6), except that the matrix elements occur in different positions in the matrix. The matrix selectors 106, 108 operate by, for example, reading the matrix elements from a common memory (not visible), the sequence of read addresses being altered depending on whether the frame-block mode is employed or not.

If the frame-block mode is employed but the resolution is not converted, the bit shifter 110 is disabled. The butterfly processor 94 combines the intermediate results output by the second multiply-accumulate processor 92 with the intermediate results output by the first multiply-accumulate processor 90 by addition and subtraction, and divides the resulting sums or differences by two to obtain the full-resolution results x(k) (k=0 to 8).

If the frame-block mode is employed and the resolution is converted, the bit shifter 110 is enabled, and multiplies the outputs of the first multiply-accumulate processor 90 by two. To describe the operation in this case, it is useful to make the following definitions.

$y(2k)=(x(4k)+x(4k+2))/2$

Figure 23:
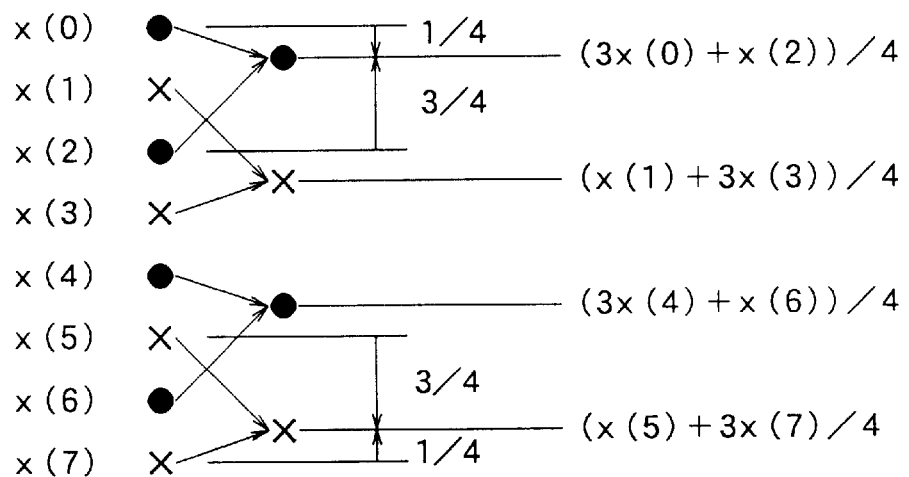
FIG. 23 is a drawing schematically illustrating vertical resolution conversion in the eleventh embodiment.

The selector 96 selects the values equivalent to the first and last of these four values, thereby obtaining equally-spaced values disposed in the top and bottom fields, as illustrated in FIG. 23. In this drawing, black dots represent pixels in the top field, x-marks represent pixels in the bottom field in the same frame, and both fields are present in the input data A and B (A=B).

The eleventh embodiment provides an IDCT processor that can operate in a variety of modes, including a progressive scanning mode and an interlaced scanning mode with either a field block structure or a frame block structure, and can carry out resolution conversion efficiently in each of these modes, the only additional hardware required being the matrix selectors 106, 108 and the bit shifter 110.

In a variation of the eleventh embodiment, the matrix computation (16) used in the frame block mode is changed to the following computation (17), in which y(k) and z(k) are defined as above (k=0 to 3).

$$\begin{bmatrix} y(0)+y(3) \\ y(1)+y(7) \\ y(1)-y(2) \\ y(0)-y(3) \\ z(0)+z(3) \\ z(1)+z(2) \\ z(1)-z(2) \\ z(0)-z(3) \end{bmatrix} = \begin{bmatrix} 2C4 & 0 & (C2-C6) & 0 & 0 & (C2+C6) & 0 & 0 \\ 2C4 & 0 & -(C2-C6) & 0 & 0 & -(C2+C6) & 0 & 0 \\ 0 & -(C3+C7) & 0 & (C5+C7) & (C1-C3) & 0 & (C1+C5) & 0 \\ 0 & (C1+C5) & 0 & -(C1-C3) & (C5+C7) & 0 & (C3+C7) & 0 \\ 0 & (C1-C5) & 0 & (C1+C3) & (C5-C7) & 0 & -(C3-C7) & 0 \\ 0 & (C3-C7) & 0 & (C5-C7) & -(C1+C3) & 0 & (C1-C5) & 0 \\ 0 & 0 & (C2+C6) & 0 & 0 & -(C2-C6) & 0 & -2C4 \\ 0 & 0 & (C2+C6) & 0 & 0 & -(C2-C6) & 0 & 2C4 \end{bmatrix} \begin{bmatrix} X(0) \\ X(1) \\ X(2) \\ X(3) \\ X(5) \\ X(6) \\ X(7) \\ X(4) \end{bmatrix} \quad (17)$$

$y(2k+1)=(x(4k+1)+x(4k+3))/2$ $z(2k)=(x(4k)-x(4k+2))/2$ $z(2k+1)=(x(4k+1)-x(4k+3))/2$

The butterfly processor 94 calculates the following values:

$(2y(k)+z(k))/4$ $(2y(k)-z(k))/4$

From the definitions given above, the calculated values are equivalent to the following values:

$(3x(4k)+x(4k+2))/4$ $(3x(4k+1)+x(4k+3))/4$ $(x(4k)+3x(4k+2))/4$ $(x(4k+1)+3x(4k+3))/4$

This computation is carried out as described in the variation of the tenth embodiment, by providing a butterfly processor in each of the multiply-accumulate processors 90, 92, thereby reducing the computational cost.

In another variation of the eleventh embodiment, the matrix selectors 106, 107 select the matrices in equations (8) and (9) whenever the resolution is not converted, even for a vertical transform in the frame-block mode.

In still another variation, the matrix selectors 106, 108 are omitted. This variation is useful when the frame-block mode is not employed.

Next, a twelfth embodiment will be described. The twelfth embodiment is a two-dimensional resolution-converting IDCT processor.

Figure 24:
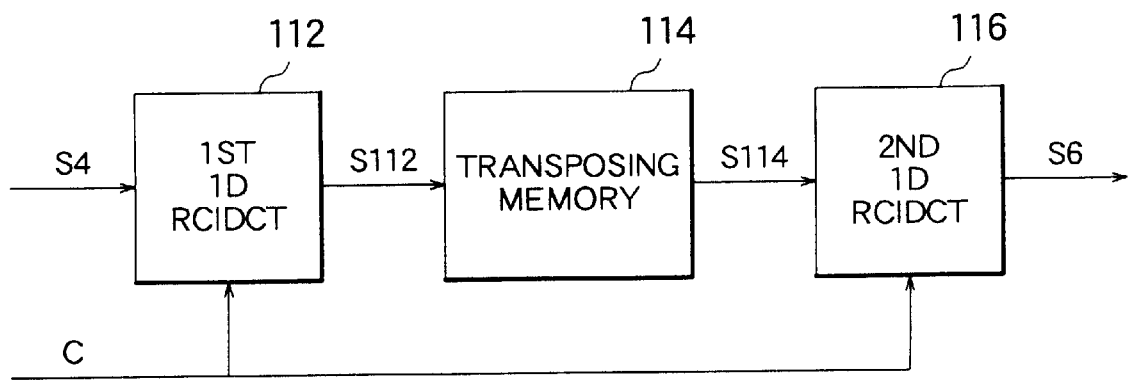
FIG. 24 is a block diagram of a two-dimensional resolution-converting IDCT processor illustrating a twelfth embodiment of the invention.

Referring to FIG. 24, the twelfth embodiment comprises a first one-dimensional (1D) resolution-converting IDCT processor 112, a transposing memory 114, and a second one-dimensional resolution-converting IDCT processor 116. The one-dimensional resolution-converting IDCT processors 112, 116 are controlled by a control signal C as described in the tenth and eleventh embodiments.

The first one-dimensional resolution-converting IDCT processor 112 has, for example, the structure described in the tenth embodiment. The first one-dimensional resolution-converting IDCT processor 112 receives input data S4 in row order, performs a one-dimensional IDCT in the horizontal direction, with resolution conversion if so selected by the control signal C, and outputs transformed data S112 in row order.

The transposing memory 114 stores an m-by-n block of transformed data S112 (where, for example, m=n=8), and outputs the block in column order. The output data S114 read from the transposing memory 114 represent a block that has been transposed; that is, the horizontal and vertical directions have been interchanged within the block.

The second one-dimensional resolution-converting IDCT processor 116 has, for example, the structure described in the eleventh embodiment, and performs a one-dimensional IDCT in the vertical direction of the original data S4.

When resolution conversion is not selected, the twelfth embodiment performs a conventional two-dimensional IDCT. The two one-dimensional resolution-converting IDCT processors 112, 116 both produce data of the form $x(k)$.

When resolution is converted by a factor of two in the horizontal direction but not in the vertical direction, the first one-dimensional resolution-converting IDCT processor 112 operates in the resolution-converting mode described in the tenth embodiment, producing values of the form $(x(2k)+x(2k+1))/2$. The second one-dimensional resolution-converting IDCT processor 116 then performs a conventional IDCT in the vertical direction, without resolution conversion.

When resolution is converted by a factor of two in both the horizontal and vertical directions, the first one-dimensional resolution-converting IDCT processor 112 produces values of the form $(x(2k)+x(2k+1))/2$. If progressive scanning is employed, the second one-dimensional resolution-converting IDCT processor 116 also produces values of this form. If sequential scanning and the field-block mode are employed, the second one-dimensional resolution-converting IDCT processor 116 produces values of the form $(3x(2k)+x(2k+1))/4$ for top-field blocks, and of the form $(x(2k)+3x(2k+1))/4$ for bottom-field blocks. If sequential scanning and the frame-block mode are employed, for all blocks, the second one-dimensional resolution-converting IDCT processor 116 produces values of the form $(3x(4k)+x(4k+2))/4$ and $(x(4k+1)+3x(4k+3))/4$.

The twelfth embodiment can thus perform a two-dimensional IDCT in one, both, or neither of the horizontal and vertical directions, regardless of the structure of the input data. As explained in the tenth and eleventh embodiments, the two one-dimensional resolution-converting IDCT processors 112, 116 require only slight additions to the hardware configuration of a conventional one-dimensional IDCT processor. The transposing memory 114 provides an efficient means of transferring data between the two one-dimensional resolution-converting IDCT processors 112, 116, so that the second processor 116 receives the data in the correct order.

The twelfth embodiment is useful in, for example, a receiver that receives both standard- and high-definition television signals, but has a standard-definition screen. Resolution conversion is carried out when a high-definition signal is received, and is not carried out when a standard-definition signal is received.

In a variation of the twelfth embodiment, the first one-dimensional resolution-converting IDCT processor 112 operates in the vertical direction, and the second one-dimensional resolution-converting IDCT processor 116 operates in the horizontal direction.

In a variation of the eleventh and twelfth embodiments, the values output in the frame-block mode have the form $(x(4k)+3x(4k+2))/4$ and $(3x(4k+1)+x(4k+3))/4$. This variation is useful when the top field comprises odd-numbered lines and the bottom field comprises even-numbered lines.

The tenth, eleventh, and twelfth embodiments can be employed in any of the first eight embodiments. More generally, the tenth, eleventh, and twelfth embodiments can be applied to carry out selective resolution conversion in any type of picture coding or decoding apparatus using the discrete cosine transform.

The data compressor and data decompressor described in the ninth embodiment can be used in the first, second, and fourth embodiments. More generally, the ninth embodiment can be used to decode any type of predictively coded moving-picture data, regardless of whether the coding includes motion compensation.

The invention is not restricted to the block sizes and memory word width mentioned in the embodiments.

The invention can be practiced either in hardware or in software.

Those skilled in the art will recognize that further variations are possible within the scope claimed below.

What is claimed is:

1. A moving-picture decoder for decoding a coded moving-picture signal that has been coded by a discrete cosine transform with motion compensation and includes full-resolution motion vectors, comprising:

a resolution-converting IDCT processor performing an inverse discrete cosine transform with resolution conversion on said coded moving-picture signal, thereby generating a first picture signal with reduced resolution;

a resolution-converting motion compensator using said full-resolution motion vectors and a reduced-resolution reference picture signal to generate a second picture signal with reduced resolution;

an adder coupled to said resolution-converting IDCT processor and said resolution-converting motion compensator, adding said first picture signal and said second picture signal to generate an output picture signal having reduced resolution; and a memory coupled to said adder and said resolution-converting motion compensator, storing said output picture signal for use as said reference picture signal;

wherein said coded moving-picture signal has a field-based interlaced structure, and said resolution-converting motion compensator comprises:

a field decision unit adding a quantity equivalent to one-half picture element to vertical components of said full-resolution motion vectors when said first picture signal represents a bottom field and said reference picture signal represents a top field, and subtracting said quantity from the vertical components of said full-resolution motion vectors when said first picture signal represents a top field and said reference picture signal represents a bottom field.

2. A moving-picture decoder for decoding a coded moving-picture signal that has been coded by a discrete cosine transform with motion compensation and includes full-resolution motion vectors, comprising:

a resolution-converting IDCT processor performing an inverse discrete cosine transform with resolution conversion on said coded moving-picture signal, thereby generating a first picture signal with reduced resolution;

a resolution-converting motion compensator using said full-resolution motion vectors and a reduced-resolution reference picture signal to generate a second picture signal with reduced resolution;

an adder coupled to said resolution-converting IDCT processor and said resolution-converting motion compensator, adding said first picture signal and said second picture signal to generate an output picture signal having reduced resolution; and a memory coupled to said adder and said resolution-converting motion compensator, storing said output picture signal for use as said reference picture signal;

wherein said coded moving-picture signal has a frame-based interlaced structure, and said resolution-converting motion compensator comprises:

a motion-vector converter converting said full-resolution motion vectors to reduced-resolution motion vectors;

a phase decision unit determining a phase relationship between said first picture signal and said reference picture signal from vertical components of said reduced-resolution motion vectors; and A motion-compensation filter applying said reduced-resolution motion vectors to said reference picture signal and filtering resulting motion-compensated data, using different filter coefficients according to said phase relationship and the vertical components of said reduced-resolution motion vectors.

3. A moving-picture decoder for decoding a coded moving-picture signal that has been coded by a discrete cosine transform with motion compensation and includes full-resolution motion vectors, comprising:

a resolution-converting IDCT processor performing an inverse discrete cosine transform with resolution conversion on said coded moving-picture signal, thereby generating a first picture signal with reduced resolution;

a resolution-converting motion compensator using said full-resolution motion vectors and a reduced-resolution reference picture signal to generate a second picture signal with reduced resolution;

an adder coupled to said resolution-converting IDCT processor and said resolution-converting motion compensator, adding said first picture signal and said second picture signal to generate an output picture signal having reduced resolution; and a memory coupled to said adder and said resolution-converting motion compensator, storing said output picture signal for use as said reference picture signal;

wherein said resolution-converting motion compensator comprises:

a progressive-scanning resolution-converting motion compensation unit having a first motion-vector converter converting said full-resolution motion vectors to reduced-resolution motion vectors, and a motion-compensation calculation unit applying said reduced-resolution motion vectors to said reference picture signal;

a field-based interlaced-scanning resolution-converting motion compensation unit having a field decision unit adding a quantity equivalent to one-half picture element to vertical components of said full-resolution motion vectors when said first picture signal represents a bottom field and said reference picture signal represents a top field, and subtracting said quantity from the vertical components of said full-resolution motion vectors when said first picture signal represents a top field and said reference picture signal represents a bottom field;

a frame-based interlaced-scanning resolution-converting motion compensation unit having a second motion-vector converter converting said full-resolution motion vectors to reduced-resolution motion vectors, a phase decision unit determining a phase relationship between said first picture signal and said reference picture signal from the vertical components of said reduced-resolution motion vectors, and a motion-compensation calculation filter applying said reduced-resolution motion vectors to said reference picture signal and filtering resulting motion-compensated data, using different filter coefficients according to the vertical components of said reduced-resolution motion vectors and said phase relationship; and a selector supplying said full-resolution motion vectors to a selected one of said progressive-scanning resolution-converting motion compensation unit, said field-based interlaced-scanning resolution-converting motion compensation unit, and said frame-based interlaced-scanning resolution-converting motion compensation unit, according to a structure of said coded moving-picture signal.

4. A moving-picture decoder for decoding a coded moving-picture signal that has been coded by a discrete cosine transform with motion compensation and includes full-resolution motion vectors, comprising:

a resolution-converting IDCT processor performing an inverse discrete cosine transform with resolution conversion on said coded moving-picture signal, thereby generating a first picture signal with reduced resolution;

a resolution-converting motion compensator using said full-resolution motion vectors and a reduced-resolution reference picture signal to generate a second picture signal with reduced resolution;

an adder coupled to said resolution-converting IDCT processor and said resolution-converting motion compensator, adding said first picture signal and said second picture signal to generate an output picture signal having reduced resolution;

a memory coupled to said adder and said resolution-converting motion compensator, storing said output picture signal for use as said reference picture signal; and a filter filtering said output picture signal, operating with different characteristics depending on whether said coded moving-picture signal was predictively coded;

wherein said coded moving-picture signal represents an intra-frame followed by a plurality of predictively coded frames, said filter operates with an initial low-pass characteristic for said intra-frame, and said filter operates with progressively weakening low-pass characteristics, none stronger than said initial low-pass characteristic, over said plurality of predictively coded frames.

5. A picture coding and decoding system comprising:

a moving-picture decoder for decoding a coded moving-picture signal that has been coded by a discrete cosine transform with motion compensation and includes full-resolution motion vectors, the motion picture decoder having:

a resolution-converting IDCT processor performing an inverse discrete cosine transform with resolution conversion on said coded moving-picture signal, thereby generating a first picture signal with reduced resolution;

a resolution-converting motion compensator using said full-resolution motion vectors and a reduced-resolution reference picture signal to generate a second picture signal with reduced resolution;

an adder coupled to said resolution-converting IDCT processor and said resolution-converting motion compensator, adding said first picture signal and said second picture signal to generate an output picture signal having reduced resolution; and a memory coupled to said adder and said resolution-converting motion compensator, storing said output picture signal for use as said reference picture signal; and a moving picture coder, the moving-picture coder coding an input signal to generate said coded moving-picture signal, the moving-picture coder having:

a resolution-converting motion estimator comparing said input signal with a third picture signal having reduced resolution, detecting motion, selecting one of predective coding and intra-frame coding, and generating full-resolution motion vectors if said predictive coding is selected;

a resolution-converting motion compensator coupled to said resolution-converting motion estimator, applying said full-resolution motion vectors to said third picture signal and performing resolution conversion, thereby generating a fourth picture signal having full resolution and a fifth picture signal having said reduced resolution, when said predicitve coding is selected;

a subtracter coupled to said resolution-converting motion compensator, generating a sixth picture signal by subtracting said fourth picture signal from said input signal when said predictive coding is selected, said sixth picture signal being identical to said input signal when said intra-frame coding is selected;

a DCT processor coupled to said subtracter, carrying out a discrete cosine transform on said sixth picture signal, thereby obtaining a transformed picture signal;

a resolution-converting IDCT processor coupled to said DCT processor, carrying out an inverse discrete cosine transform and resolution conversion on said transformed picture signal, thereby obtaining a seventh picture signal having said reduced resolution;

an adder coupled to said resolution-converting IDCT processor, adding said fifth picture signal and said seventh picture signal, thereby obtaining said third picture signal; and a memory coupled to said adder, storing said third picture signal.

6. The moving-picture coding and decoding system of claim 5, the moving-picture coder also having:

a quantizer coupled to the DCT processor in the moving picture coder, quantizing said transformed picture signal to obtain a quantized signal;

a variable-length coder coupled to said quantizer, performing variable-length coding on said quantized signal; and an inverse quantizer coupled to said quantizer, dequantizing said quantized signal for input to the resolution-converting IDCT processor in the moving picture coder.

7. The moving-picture coding and decoding system of claim 5, the moving-picture coder also having:

a data compressor coupled to the adder in the moving-picture coder, compressively coding said third picture signal for storage in the memory in the moving-picture coder; and a data decompressor coupled to the memory in the moving-picture coder, expanding the compressed third picture signal stored in the memory in the moving-picture coder.

8. A method of decoding a coded moving-picture signal that has been coded by a discrete cosine transform with motion compensation and includes full-resolution motion vectors, comprising the steps of:

(a) performing an inverse discrete cosine transform with resolution conversion on said coded moving-picture signal, thereby generating a first picture signal with reduced resolution;

(b) performing motion compensation, using said full-resolution motion vectors and a reduced-resolution reference picture signal, to generate a second picture signal with reduced resolution;

(c) adding said first picture signal and said second picture signal to generate an output picture signal having reduced resolution; and (d) storing said output picture signal in a memory for use as said reference picture signal;

wherein said coded moving-picture signal has a field-based interlaced structure, and said step (b) further comprises the steps of:

adding a quantity equivalent to one-half picture element to vertical components of said full-resolution motion vectors when said first picture signal represents a bottom field and said reference picture signal represents a top field; and subtracting said quantity equivalent to one-half picture element from the vertical components of said full-resolution motion vectors when said first picture signal represents a top field and said reference picture signal represents a bottom field.

9. A method of decoding a coded moving-picture signal that has been coded by a discrete cosine transform with motion compensation and includes full-resolution motion vectors, comprising the steps of:

(a) performing an inverse discrete cosine transform with resolution conversion on said coded moving-picture signal, thereby generating a first picture signal with reduced resolution;

(b) performing motion compensation, using said full-resolution motion vectors and a reduced-resolution reference picture signal, to generate a second picture signal with reduced resolution;

(c) adding said first picture signal and said second picture signal to generate an output picture signal having reduced resolution; and (d) storing said output picture signal in a memory for use as said reference picture signal;

wherein said coded moving-picture signal has a frame-based interlaced structure, and said step (b) further comprises the steps of:

converting said full-resolution motion vectors to reduced-resolution motion vectors;

determining a phase relationship between said first picture signal and said reference picture signal from vertical components of said reduced-resolution motion vectors;

applying said reduced-resolution motion vectors to said reference picture signal to obtain motion-compensated data; and filtering said motion-compensated data, using different filter coefficients according to said phase relationship and the vertical components of said reduced-resolution motion vectors.

10. A method of decoding a coded moving-picture signal that has been coded by a discrete cosine transform with motion compensation and includes full-resolution motion vectors, comprising the steps of:
   (a) performing an inverse discrete cosine transform with resolution conversion on said coded moving-picture signal, thereby generating a first picture signal with reduced resolution;
   (b) performing motion compensation, using said full-resolution motion vectors and a reduced-resolution reference picture signal, to generate a second picture signal with reduced resolution;
   (c) adding said first picture signal and said second picture signal to generate an output picture signal having reduced resolution;
   (d) storing said output picture signal in a memory for use as said reference picture signal; and
   (e) filtering said output picture signal, using different filter characteristics depending on whether said moving-picture signal was predictively coded;
      wherein said coded moving-picture signal represents an intra-frame followed by a plurality of predictively coded frames, said step (e) uses an initial low-pass filter characteristic for said intra-frame, and said step (e) operates with progressively weakening low-pass filter characteristics, none stronger than said initial low-pass filter characteristic, over said plurality of predictively coded frames.

11. A method of coding and decoding an input signal representing a moving picture, comprising:
   a method of decoding a coded moving-picture signal, having the steps of:
      (a) performing an inverse discrete cosine transform with resolution conversion on said coded moving-picture signal, thereby generating a first picture signal with reduced resolution;
      (b) performing motion compensation, using said full-resolution motion vectors and a reduced-resolution reference picture signal, to generate a second picture signal with reduced resolution;
      (c) adding said first picture signal and said second picture signal to generate an output picture signal having reduced resolution;
      (d) storing said output picture signal in a memory for use as said reference picture signal;
   and
   a method of coding said input signal, having the further steps of:
      (j) comparing said input signal with a third picture signal having reduced resolution, detecting motion, selecting one of predictive coding and intra-frame coding, and generating full-resolution motion vectors if said predictive coding is selected;
      (k) applying said full-resolution motion vectors to said third picture signal and performing resolution conversion, thereby generating a fourth picture signal having full resolution and a fifth picture signal having said reduced resolution, when said predictive coding is selected;
      (l) generating a sixth picture signal by subtracting said fourth picture signal from said input signal when said predictive coding is selected, said sixth picture signal being identical to said input signal when said intra-frame coding is selected;
      (m) carrying out a discrete cosine transform on said sixth picture signal, thereby obtaining a transformed picture signal;
      (n) carrying out an inverse discrete cosine transform and resolution conversion on said transformed picture signal, thereby obtaining a seventh picture signal having said reduced resolution;
      (o) adding said fifth picture signal and said seventh picture signal, thereby obtaining said third picture signal; and
      (p) storing said third picture signal in a memory.

12. The method of claim 11, further comprising the steps of:
   (q) quantizing said transformed picture signal to obtain a quantized signal;
   (r) performing variable-length coding of said quantized signal; and
   (s) dequantizing said quantized signal before said step (n).

13. The method of claim 11, further comprising the steps of:
   compressively coding said third picture signal before said step (p); and
   expanding the compressed third picture signal after said step (p).

* * * * *